(12) United States Patent
Zhong

(10) Patent No.: US 7,573,530 B2
(45) Date of Patent: Aug. 11, 2009

(54) METHOD AND SYSTEM FOR VIDEO NOISE REDUCTION BASED ON MOVING CONTENT DETECTION

(75) Inventor: Sheng Zhong, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 799 days.

(21) Appl. No.: 11/313,871

(22) Filed: Dec. 20, 2005

(65) Prior Publication Data
US 2007/0139527 A1 Jun. 21, 2007

(51) Int. Cl.
H04N 7/01 (2006.01)
H04N 5/21 (2006.01)

(52) U.S. Cl. .................... 348/452; 348/620; 348/701

(58) Field of Classification Search .......... 348/451, 348/452, 597, 620, 607, 699–701; H04N 7/01, H04N 11/20, 5/21, 9/74
See application file for complete search history.

(56) References Cited

U.S. PATENT DOCUMENTS 6,643,387 B1 * 11/2003 Sethuraman et al. ........ 348/699

2008/0062327 A1 * 3/2008 MacInnis et al. ............ 348/607

* cited by examiner

Primary Examiner—Sherrie Hsia
(74) Attorney, Agent, or Firm—McAndrews, Held & Malloy

(57) ABSTRACT

A method and a system for video noise reduction based on moving content detection are described. Aspects of a system for processing images may include circuitry within a chip that determines a motion metric that indicates an amount of motion between a current video picture and at least one of the following: at least one preceding video picture and at least one subsequent video picture. The motion metric may be computed from a maximum value derived by summing, over a plurality of corresponding pixels that are located within a region around a reference pixel in a current video picture, differences in values of the plurality of corresponding pixels. The circuitry within the chip may also compute a blending factor that has a nonlinear relationship to the motion metric. The circuitry within the chip may adjust at least one pixel in the current video picture based on the computed blending factor.

24 Claims, 11 Drawing Sheets

METHOD AND SYSTEM FOR VIDEO NOISE REDUCTION BASED ON MOVING CONTENT DETECTION

CROSS-REFERENCE TO RELATED APPLICATIONS/INCORPORATION BY REFERENCE

This application makes reference to:
U.S. patent application Ser. No. 11/314,679 filed on even date herewith;
U.S. patent application Ser. No. 11/314,690 filed on even date herewith;
U.S. patent application Ser. No. 11/313,592 filed on even date herewith; and
U.S. patent application Ser. No. 11/314,680 filed on even date herewith.

Each of the above stated applications is hereby incorporated by reference in its entirety.

FIELD OF THE INVENTION

Certain embodiments of the invention relate to processing of video signals. More specifically, certain embodiments of the invention relate to a method and system for video noise reduction based on moving content detection.

BACKGROUND OF THE INVENTION

In video system applications, random noise present in analog video signals, such as NTSC or PAL signals, for example, may result in images that are less than visually pleasing to the viewer. To address this problem, noise reduction (NR) operations may be utilized to remove, at least partially, the analog noise present. Traditional NR operations use either the infinite impulse response (IIR) filtering based method or the finite impulse response (FIR) filtering based method. IIR filtering can significantly attenuate high frequency noise. However, some NR operations may result in visual artifacts such as motion trails, jittering, and/or wobbling at places where there is object motion if the amount of filtering is not conservative enough. Setting the IIR filtering conservatively will mitigate the noise removing capability, even for places where is no or little motion, such as a static area in the video, resulting in many instances where objectionable noise artifacts remain in the video signal. [Note: this invention is about noise reduction.

Other traditional NR operations may be FIR filtering based. FIR-based filtering is not subject to the artifacts of motion trail, motion blurry, jittering and/or wobbling as much as IIR-based filtering is. It may provide acceptable perceptual quality for moving areas. But in practical NR system, which cannot employ a large number of video images to perform FIR filtering (due to cost considerations), its noise reducing power is very limited for areas of no or little motion.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for video noise reduction based on moving content detection, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a method and/or system for video noise reduction based on moving content detection. Blending may comprise computing a value of a pixel in a current output video picture based on contributions from a plurality of input video pictures. The contributions may be controlled based on a blending factor. Blending may provide improved video quality through noise reduction. In a motion adaptive system, the value of the blending factor may adapt dynamically to detected motion among a sequence of video pictures. Detected motion may be estimated based on a computed motion metric. The motion metric may be computed based on a sum computed over a plurality of neighboring pixels. A corresponding adjusted motion metric may be computed by adjusting the value of the motion metric based on at least one partial sum computed over a portion of the plurality of pixels in the pixel neighborhood. In various embodiments of the invention, the relationship between blending factor and the motion metric may be adapted to provide improved noise reduction performance in video systems in comparison to some conventional noise reduction algorithms.

Certain embodiments of the invention may be found in a system and/or method for video noise reduction by blended finite impulse response (FIR) and infinite impulse response (IIR) filtering. A filtering mode may be selected to generate noise-reduced pixels based on FIR filtering, IIR filtering, or a blend of FIR/IIR filtering. Blending a current pixel and an FIR-filtered current pixel based on an FIR blending factor may generate an FIR blended current pixel. The FIR filtering may be based on the current pixel, a previous collocated pixel and a next collocated pixel. Blending the current pixel and an IIR-filtered current pixel based on an IIR blending factor may generate an IIR blended current pixel. Blending the FIR blended current pixel and the IIR blended current pixel based on an adaptive blending factor may dynamically generate a blended output pixel. The blending factors may be dynamically modified based on a corresponding motion metric or adjusted motion metric.

Figure 1:
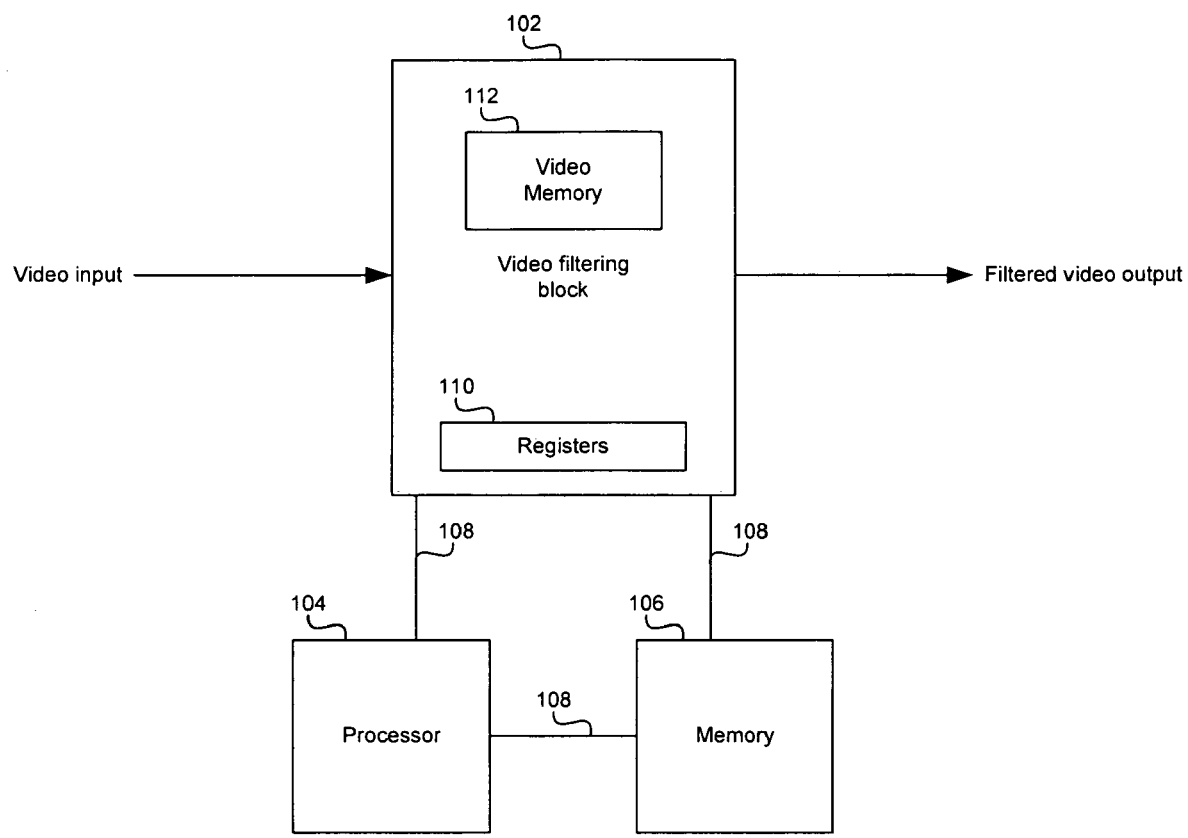
FIG. 1 is a block diagram of an exemplary video noise reduction system, in accordance with an embodiment of the invention.

FIG. 1 is a block diagram of an exemplary video noise reduction system, in accordance with an embodiment of the invention. Referring to FIG. 1 there is shown a video filtering block 102, a processor 104, system memory 106, and a system bus 108. The video filtering block 102 may comprise registers 110 and video memory 112.

The processor 104 comprise suitable logic, circuitry and/or code that may be adapted to process information and/or data associated with the processing of video signals. The processor 104 may, for example, determine values for parameters that may be stored in registers 110 to control the operation of the video filtering block 102. The system memory 106 may comprise suitable logic, circuitry and/or code that may be utilized to store data and/or control information that may be utilized in at least a portion of the operation of the processor 104 and/or video filtering block 102. The system bus 108 may comprise a medium by which information may be exchanged between the video filtering block 102, the processor 104, and/or the system memory 106.

The video filtering block 102 may receive video input. The video input may comprise a video signal that contains information from a plurality of video pictures. A video picture may comprise a field picture or a frame picture. A frame picture may comprise a plurality of pixels that is contained in a plurality of field pictures, for example. For example, a frame picture may comprise a plurality of pixels arranged as H lines and W pixels in each line. The lines may be numbered, 0, 1 . . . H-2, H-1. An upper field picture, or top field picture, may comprise a plurality of pixels arranged as approximately H/2 lines and W pixels in each line. The upper field picture may comprise pixels corresponding to lines 0, 2, 4 . . . H-2 from the frame picture. A lower field picture, or bottom field picture, may comprise a plurality of pixels arranged as approximately H/2 lines and W pixels in each line. The lower field picture may comprise pixels corresponding to lines 1, 3, 5 . . . H-1 from the frame picture. The frame picture may comprise the pixels contained collectively in the upper field picture and the lower field picture. The upper field and lower field pictures may form an interlaced representation of the frame picture.

The video filtering block 102 may perform any of a variety of video processing tasks on the video input. As a result, the video filtering block 102 may adjust at least one value of one or more pixels in a received video picture to generate a filtered video output. A pixel may comprise a brightness Y (luma) value, or a pixel may comprise a Y value and color difference values red minus luma (R-Y, or U) or chroma red (Cr), and blue minus luma (B-Y, or V), or chroma blue (Cb). An analog video signal that comprises Y, R-Y, and B-Y information may be referred to as a YUV signal. Alternatively, digital video version of a YUV signal may be referred to as a YCbCr signal. In some representations, the Cb and Cr may be represented collectively as chroma (C) and the corresponding video signal referred to as comprising luminance and chroma (Y/C) information.

The video filtering block 102 may access to pixel information contained in a current, preceding and/or subsequent video input in video memory 112. This information may have been fetched from the system memory 106 to video memory 112. The information may be subsequently used during video processing operations. The video memory 112 may also be utilized to store pixel information that comprises intermediate processing results.

The registers 110 may store information that is utilized to control video processing tasks performed by the video filtering block 102. For example, the registers 110 may be utilized to store configuration information that selects a video processing task to be performed by the video filtering block 102. The registers 110 may, for example, be utilized to store parameter information that determines scale factors that may be applied when processing video input and/or intermediate results.

In operation, the video filtering block 102, the processor 104, and the system memory 106 may be coupled to the system bus 108. The system memory 106 may be utilized to store some picture frame data that are necessary for the current or future video processing tasks. The system memory 106 may also be utilized to store configuration and/or parameter information, a portion of which may be stored in the registers 110 within the video filtering block 102, for example. The system memory 106 may also be utilized to store executable code that may control the operation of the processor 104. The processor 104 may execute the stored executable code that may cause the processor 104 to perform steps that result in the selection of configuration and/or parameter information that may be stored in the system memory 106. The selected configuration and/or parameter information may subsequently be retrieved from the system memory 106 and written to the registers 110.

Figure 2:
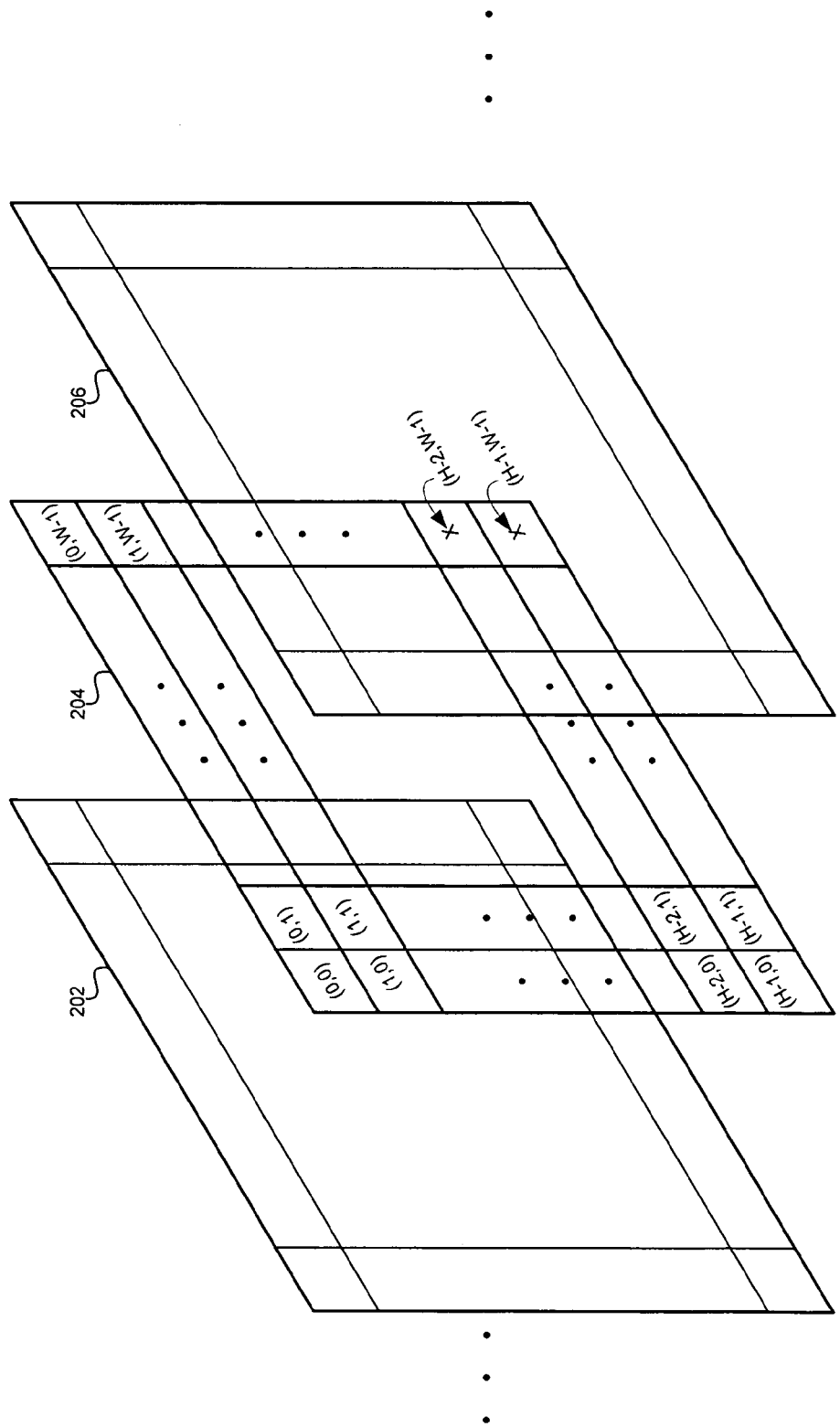
FIG. 2 is a diagram illustrating exemplary consecutive video pictures, in connection with an embodiment of the invention.

FIG. 2 is a diagram illustrating exemplary consecutive video pictures, in connection with an embodiment of the invention. Referring to FIG. 2, there is shown a plurality of video pictures 202, 204, and 206. Each of the video pictures may comprise a plurality of pixel arranged as H lines with W pixels per line. The lines may be identified by line numbers comprising 0, 1 . . . H-2, H-1, for example. The pixels within a line may be identified by column numbers comprising 0, 1, . . . , W-1, for example. An individual pixel may be indicated based on a (row, column) tuple. For example, a pixel in the upper left corner of the video picture 204 may be indicated by the tuple (0,0). Each of the video pictures may be received at distinct time instants. For example, video picture 204 may represent a current video picture that was received at a time instant identified by t=N. Video picture 206 may represent a preceding video picture that was received at a time instant identified by t=N−1. Video picture 202 may represent a subsequent video picture that was received at a time instant identified by t=N+1.

Some television broadcast standards, such as those based on the recommendations of the National Broadcast Standards Committee (NTSC), may specify a rate at which video pictures may be transmitted. The rate may specify a time interval between video pictures 202, 204 and 206. Other television broadcast standards may include Phase Alternating Line (PAL) and Système Électronique pour Couleur avec Mémoire (SECAM), each which may specify a rate at which video pictures may be transmitted. The transmission of video field pictures may be referred to as an interlace scan transmission, or interlaced video. The transmission of video frame pictures may be referred to as progressive scan transmission, or progressive video.

Various embodiments of the invention may comprise a method and a system for noise reduction (NR) in a received video input. The invention may not be limited to NR applications and various embodiments may also be utilized in other video processing applications, such as de-interlacing and 3D combing, for example. In NR, at least one value of a pixel in a current video picture may be combined with a corresponding at least one value of a pixel in one or more preceding video pictures and/or a corresponding at least one value of a pixel in one or more subsequent video pictures. The current video picture and the one or more preceding and/or subsequent video pictures may be of the same type, i.e., of the same field polarity. For example, in the NR processing task, the current video picture and one or more preceding and/or subsequent video pictures may be upper field pictures. Similarly, the current video picture and one or more preceding and/or subsequent video pictures may be lower field pictures. Alternately, the current video picture and one or more preceding and/or subsequent video pictures may be frame pictures. Furthermore, NR may comprise combining a common pixel value type among the pixels processed. For example, when processing YUV or YCbCr signals, NR may comprise combining Y values among the pixel values being combined. Separately, Cb or B-Y pixel values may be combined, and subsequently Cr or R-Y pixel values may be combined. NR processing may result in an adjustment in at least one pixel value of the current video picture as a result of the combining.

The combining of at least one value of a pixel in a current video picture with a corresponding at least one value of a pixel in one or more preceding video pictures and a corresponding at least one value of a pixel in one or more subsequent video pictures may be referred to as finite impulse response (FIR) filtering. A filtered video output resulting from FIR filtering may be referred to as an FIR filtered video picture. The combining of at least one value of a pixel in a current video picture with a corresponding at least one value of a pixel in one or more preceding filtered output video pictures may be referred to as infinite impulse response (IIR) filtering. A filtered video output resulting from IIR filtering may be referred to as an IIR filtered video picture.

The subsequent combining of at least one value of a pixel in a current video picture with a corresponding at least one value of a pixel in a filtered video picture may be referred to as blending. Blending may be utilized to generate a blended video picture. The extent to which pixels in a current video picture may be combined with pixels in a filtered video picture may be based on a blending factor. The subsequent combining of at least one value of a pixel in a current video picture with a corresponding at least one value of a pixel in an FIR filtered video picture may be referred to as FIR blending. The extent to which pixels in a current video picture may be combined with pixels in an FIR filtered video picture may be based on an FIR blending factor. FIR blending may be utilized to generate an FIR blended video picture. FIR blending may be referred to as an FIR NR mode.

The subsequent combining of at least one value of a pixel in a current video picture with a corresponding at least one value of a pixel in an IIR filtered video picture may be referred to as IIR blending. The extent to which pixels in a current video picture may be combined with pixels in an IIR filtered video picture may be based on an IIR blending factor. IIR blending may be utilized to generate an IIR blended video picture. IIR blending may be referred to as an IIR NR mode.

The combining of at least one value of a pixel in an FIR blended video picture and a corresponding at least one value of a pixel in an IIR blended video picture may be referred to as adaptive blending. The extent to which pixels in an FIR blended video picture may be combined with pixels in an IIR blended video picture may be based on an adaptive blending factor. Adaptive blending may be utilized to generate an adaptive blended video picture. Adaptive blending may be referred to as an adaptive blending mode.

A blending factor, such as an FIR blending factor, IIR blending factor, or adaptive blending factor, may be computed based on motion detection in a current video picture and one or more subsequent and/or preceding video pictures of a common type. Motion may be detected in an FIR NR mode if at least one value of a pixel in a current video picture is different from a corresponding at least one value of a pixel in at least one preceding video picture. This difference may be referred to as a leading difference. Motion may also be detected in an FIR NR mode if at least one value of a pixel in a current video picture is different from a corresponding at least one value of a pixel in at least one subsequent video picture. This difference may be referred to as a trailing difference. Thus, motion may be detected relative to a current pixel in a current video picture by adding an absolute value of the corresponding leading difference and an absolute value of the corresponding trailing difference.

Determination of motion between video pictures based on a single pixel may be unreliable due to noise, or other errors that affect the single pixel, which may render a misleading indication of motion. Consequently, a motion metric may be derived by computing a sum over a plurality of proximately located pixels within the current video picture and corresponding preceding and/or subsequent video pictures. The sum may be normalized by dividing by a normalization factor. The plurality of proximately located pixels may comprise a transform window. A size of a transform window may be indicated by the number of rows and the number of columns contained in the transform window. A transform window may also be associated with a normalization factor. A normalization factor may be derived by multiplying the number of rows by the number of columns in the transform window. For example, a transform window that comprises 3 rows and 5 columns may be referred to as a 3×5 transform window. The normalization factor may be equal to 15, for example.

For example, in the video picture 204, the pixels (0,0), (0,1), (0,2), (1,0), (1,1), (1,2) (2,0), (2,1) and (2,2) may comprise a 3×3 transform window, with a corresponding normalization factor equal to 9. The neighborhood of the transform window may be defined by the location of one of the pixels within the transform window. For example, the neighborhood for the 3×3 transform window may be defined by a pixel in the center of the neighborhood. In this case, for the transform window comprising the pixels indicated above, the neighborhood may be defined by the pixel located at (1,1). Consequently, a motion metric for a 3×3 transform window may be computed relative to a current pixel in a current video picture by deriving a sum based on adding an absolute value of the corresponding leading difference and an absolute value of the corresponding trailing difference for each pixel in the transform window. The sum may subsequently be divided by a normalization factor of 9.

The plurality of current pixels may be located at (0,0), (0,1), (0,2), (1,0), (1,1), (1,2) (2,0), (2,1) and (2,2), within the current video picture for example. The plurality of preceding pixels may be located at (0,0), (0,1), (0,2), (1,0), (1,1), (1,2) (2,0), (2,1) and (2,2) within each of the one or more preceding video pictures. The plurality of subsequent pixels may be located at (0,0), (0,1), (0,2), (1,0), (1,1), (1,2) (2,0), (2,1) and (2,2) within each of the one or more subsequent video pictures. An FIR motion metric may be computed for FIR NR mode, an IIR motion metric may be computed for IIR NR mode, and an adaptive motion metric may be computed for an adaptive motion metric.

Figure 3:
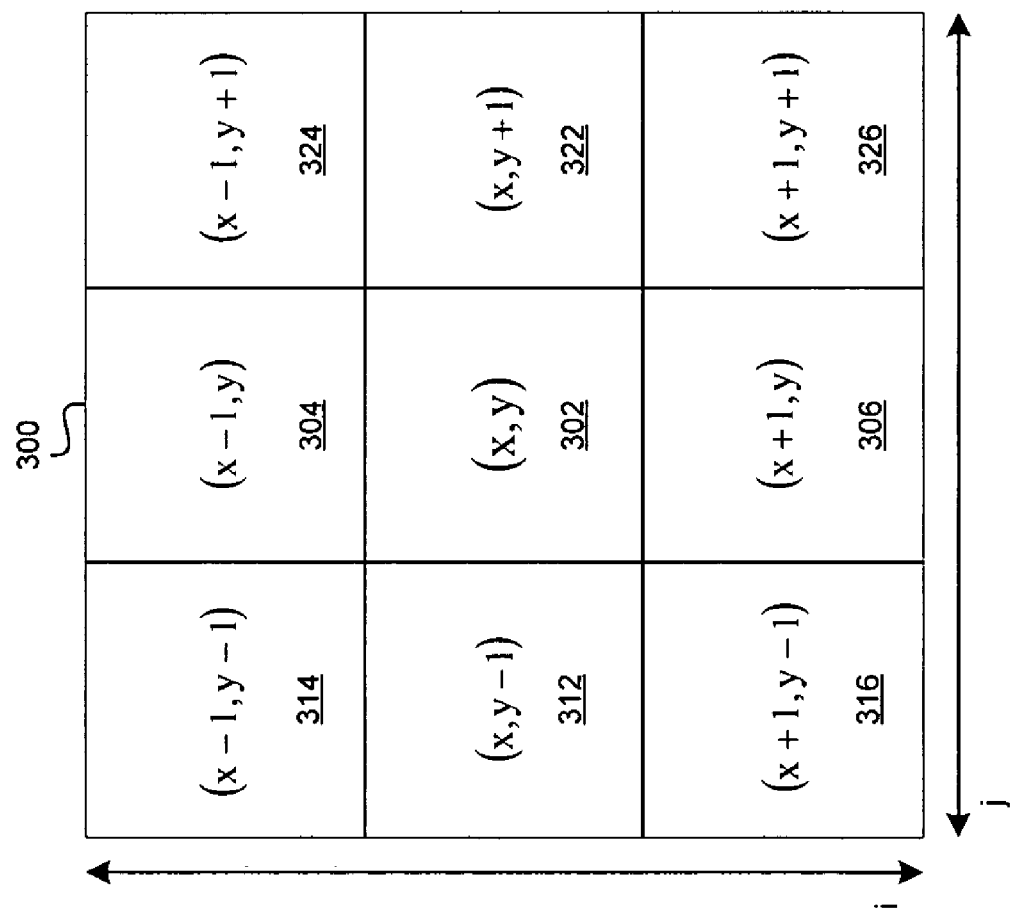
FIG. 3 is a diagram illustrating an exemplary H×W pixel neighborhood, in connection with an embodiment of the invention.

In various embodiments of the invention an adjusted motion metric may be computed. FIG. 3 is a diagram illustrating an exemplary H×W pixel neighborhood, in connection with an embodiment of the invention. Referring to FIG. 3, there is shown a pixel neighborhood 300, a center pixel 302, and a plurality of pixels 304, 306, 312, 314, 316, 322, 324 and 326. In the exemplary pixel neighborhood 300, H=3 and W=3. Relative to the center pixel 302, the pixels 312, 314 and 316 may have a plurality of left pixels located to the center pixel 302. Relative to the center pixel 302, the pixels 322, 324 and 326 may have a plurality of right pixels to the center pixel 302. Relative to the center pixel 302, the pixels 304, 314 and 324 may have a plurality of upper pixels to the center pixel 302. These pixels may also be referred to as being located above the center pixel 302 in the pixel neighborhood. Relative to the center pixel 302, the pixels 306, 316 and 326 may have a plurality of lower pixels located to the center pixel 302. These pixels may also be referred to as being located below the center pixel 302 in the pixel neighborhood.

The location of the center pixel 302 may be represented as a tuple (x,y), where x may refer to the row in which the pixel is located in a video picture and y may refer to the column in which the pixel is located in the video picture. The location of the pixel 304 may be represented as (x−1, y), or 1 pixel above the center pixel 302. The location of the pixel 306 may be represented as (x+1, y), or 1 pixel below the center pixel 302. The location of the pixel 312 may be represented as (x,y−1), or 1 pixel left of the center pixel 302. The location of the pixel 314 may be represented as (x−1, y−1), or 1 pixel above and 1 pixel left of the center pixel 302. The location of the pixel 316 may be represented as (x+1,y−1) or 1 pixel below and 1 pixel left of the center pixel 302. The location of the pixel 322 may be represented as (x,y+1), or 1 pixel right of the center pixel 302. The location of the pixel 324 may be represented as (x−1,y+1), or 1 pixel above and 1 pixel right of the center pixel 302. The location of the pixel 326 may be represented as (x+1,y+1), or 1 pixel below and 1 pixel right of the center pixel 302. For x=1 and y=1, for example, the center pixel 302 may be located at (1,1), the pixel 304 at (0,1), the pixel 306 at (2,1), the pixel 312 at (1,0), the pixel 314 at (0,0), the pixel 316 at (2,0), the pixel 322 at (1,2), the pixel 324 at (0,2) and the pixel 326 at (2,2).

An adjustment term may be computed in an adaptive blending mode, for example by deriving a first and second right sum, a first and second left sum, a first and second upper sum and a first and second lower sum. The sums may be computed based on leading differences, trailing differences, and IIR blended differences added over a portion pixel neighborhood. Leading and trailing differences are as previously defined. An IIR blended difference may refer to a difference in at least one value of a pixel in the current video picture a corresponding at least one value of a pixel in a preceding IIR blended video picture. The first right sum may be derived by adding the corresponding leading difference for each of the plurality of right pixels. The first left sum may be derived by adding the corresponding IIR blended difference for each of the plurality of left pixels. The first upper sum may be derived by adding the corresponding IIR blended difference for each of the plurality of upper pixels. The first lower sum may be derived by adding the corresponding IIR blended difference for each of the plurality of lower pixels. A first content value may be derived by selecting a maximum value among the right sum, left sum, upper sum and lower sum.

The second right sum may be derived by adding the corresponding leading difference for each of the plurality of right pixels. The second left sum may be derived by adding the corresponding leading difference for each of the plurality of left pixels. The second upper sum may be derived by adding the corresponding leading difference for each of the plurality of upper pixels. The second lower sum may be derived by adding the corresponding leading difference for each of the plurality of lower pixels. A second content value may be derived by selecting a maximum value among the right sum, left sum, upper sum and lower sum. A final content value may be derived by selecting a maximum value among the first content value and second content value.

The adjustment term may be derived by multiplying the final content value by a scale factor. A corresponding adjusted motion metric may be derived by adding the adjustment term to the corresponding motion metric. The corresponding adjusted blending factor may be derived based on the corresponding adjusted motion metric.

Various embodiments of the invention may comprise a method and a system that computes a blending factor and/or adjusted blending factor, comprising an FIR blending factor, an IIR blending factor and/or an adaptive blending factor, based on a corresponding motion metric and/or adjusted motion metric, comprising an FIR motion metric, an IIR motion metric, and/or an adaptive motion metric. For example, an FIR blending factor may be computed based on an FIR motion metric. For example, an adjusted adaptive blending factor may be computed based on an adjusted adaptive motion metric.

In some conventional methods, the blending factor may be linearly proportional to the corresponding motion metric. For example:

$$C\_\alpha_{FIR} = c_1 + c_2 C\_MM_{FIR} \qquad \text{equation [1]}$$

where $C\_\alpha_{FIR}$ may represent a conventionally computed FIR blending factor, $C\_MM_{FIR}$ may represent a conventionally computed FIR motion metric, and $c_1$ and $c_2$ may represent constant values. By contrast, in various embodiments of the invention, there may be a nonlinear relationship between the blending factor, and the corresponding motion metric. A blending NR mode that utilizes a blending factor whose value is based on a motion metric may be referred to as a motion adaptive NR mode.

Figure 4:
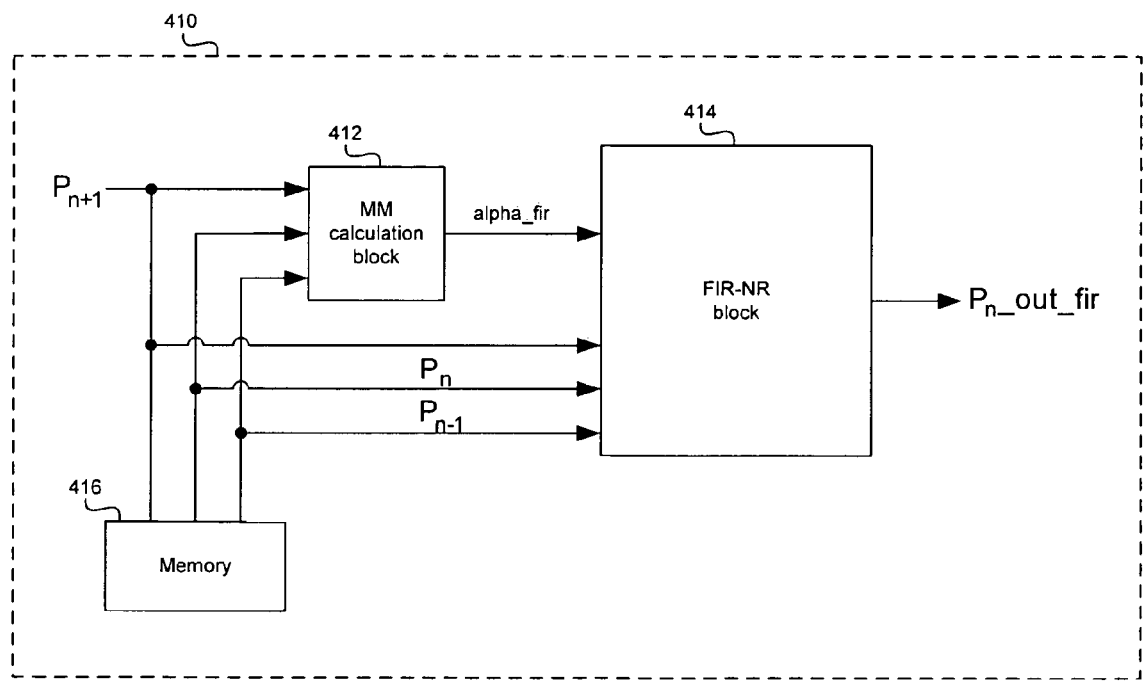
FIG. 4 is a block diagram of an exemplary finite impulse response (FIR) blending system with frame store operating in FIR noise reduction mode, in accordance with an embodiment of the invention.

FIG. 4 is a block diagram of an exemplary finite impulse response (FIR) blending system with frame store operating in FIR noise reduction mode, in accordance with an embodiment of the invention. Referring to FIG. 4 there is shown an FIR blending system 410 that may comprise a motion metric (MM) calculation block 412, an FIR noise reduction (FIR NR) block 414 and memory 416. The FIR blending system 410 may be referred to as a motion adaptive FIR NR mode system. The FIR blending system 410 may be implemented as a portion of the video processing block 102 in FIG. 1, for example. The MM calculation block 412 may comprise suitable logic, circuitry, and/or code that may be adapted to calculate an FIR MM. The MM calculation block 412 may utilize the calculated FIR MM to compute an FIR blending factor, $\alpha_{FIR}$. The memory 416 may comprise suitable logic circuitry and/or code that may be adapted to store at least a portion of video pictures received from video input and/or stored as a processed intermediate result. Stored video pictures, or portions thereof, may be retrieved from the memory 416 and utilized by the MM calculation block 412 and/or the FIR NR block 414. For example, a current video picture, $P_n$, and/or a preceding video picture, $P_{n-1}$, may be retrieved from the memory 416. A subsequent video picture, $P_{n+1}$, may be stored in the memory 416.

The MM calculation block 412 may compute an FIR MM. For example, for pixel neighborhoods comprising odd numbers of rows and columns an FIR MM based on pixel values P may be computed in accordance with the following expression:

$$MM(x, y) = \frac{1}{h \cdot w} \sum_{i=-\frac{H-1}{2}}^{\frac{H-1}{2}} \sum_{j=-\frac{W-1}{2}}^{\frac{W-1}{2}} [|P_n(i+x, j+y) - P_{n-1}(i+x, j+y)| + |P_n(i+x, j+y) - P_{n+1}(i+x, j+y)|] \quad \text{equation [2]}$$

where the tuple (x,y) may define the neighborhood of the corresponding transform window, MM(x,y) may represent the motion metric computed at the neighborhood, w may represent a number of pixels in a row within the transform window, and h may represent a number of pixels in a column within the transform window. H may represent a number of rows in the neighborhood, W may represent a number of pixels in a row in the neighborhood, and the indexes i and j may represent pixel offsets in the vertical and horizontal directions, respectively, relative to the pixel located at (x, y). For example, the indexes i and j may be added to x and y respectively to indicate a location of a pixel within the window for which the MM is being computed in equation [2]. For example, the pixel neighborhood (0,0), (0,1), (0,2), (1,0), (1,1), (1,2) (2,0), (2,1) and (2,2), may be defined for a neighborhood at (1,1) with H=h=3 and W=w=3. $P_n(i+x,j+y)$ may represent a value of a pixel located at (i+x,j+y) in a current video picture 204, $P_{n-1}(i+x,j+y)$ may represent a value of a corresponding pixel located at (i+x,j+y) in a preceding video picture 206, and $P_n(i+x,j+y)$ may represent a value of a pixel located at (i+x,j+y) in a subsequent video picture 202. The current, preceding and subsequent video pictures may be of the same type in equation [2]. For example, the current, preceding and subsequent video pictures may each be upper field video pictures, lower field video pictures, or frame video pictures.

A pixel value P may represent a luma pixel value, a Cb or color difference B-Y pixel value, or a Cr or color difference R-Y pixel value. In each case a corresponding $MM_{luma}$, $MM_{Cb}$, or $MM_{Cr}$ may be computed. A final motion metric may be computed based on a weighted average sum of the respective motion metrics. For example, for an FIR NR mode, an $MM_{FIR}$ may be computed by the MM calculation block 412 according to the following expression:

$$MM_{FIR} = c_0 MM_{luma} + c_1 MM_{Cb} + c_2 MM_{Cr} \quad \text{equation [3]}$$

and $$c_0 + c_1 + c_2 = 1 \quad \text{equation [4]}$$

where $c_0$, $c_1$, and $c_2$ may represent constants that may be stored in the registers 110 in FIG. 1, for example.

A neighborhood size, such as represented by the number of rows, H, and the number of columns W, may be determined by considering the effect of the movement of thin objects, for example a thin edge in an image, and by considering the efficacy of a neighborhood of the given size in reducing or "smoothing outs" noise. Exemplary neighborhood sizes may comprise 3 rows and 3 columns, or 3×3, 5 rows and 3 columns, 5×3, 3×5, 7×3, 5×5, 7×5, and 7×7.

The computation for the luma motion metric $MM_{luma}$ may differ from the computation for the chroma motion metrics $MM_{Cb}$ and $MM_{Cr}$ because the number of pixels in a video picture comprising luma pixel values may be greater than the number of pixels in the video picture comprising chroma pixel values. This may be referred to as chroma subsampling in a YCbCr signal. In chroma subsampling, a portion of the pixels within a pixel neighborhood that may be sampled for luma pixel values may not be sampled for Cb or Cr pixel values. Pixels that may not be sampled for chroma pixel values may be considered to represent Cb and Cr values equal to 0.

Figure 5:
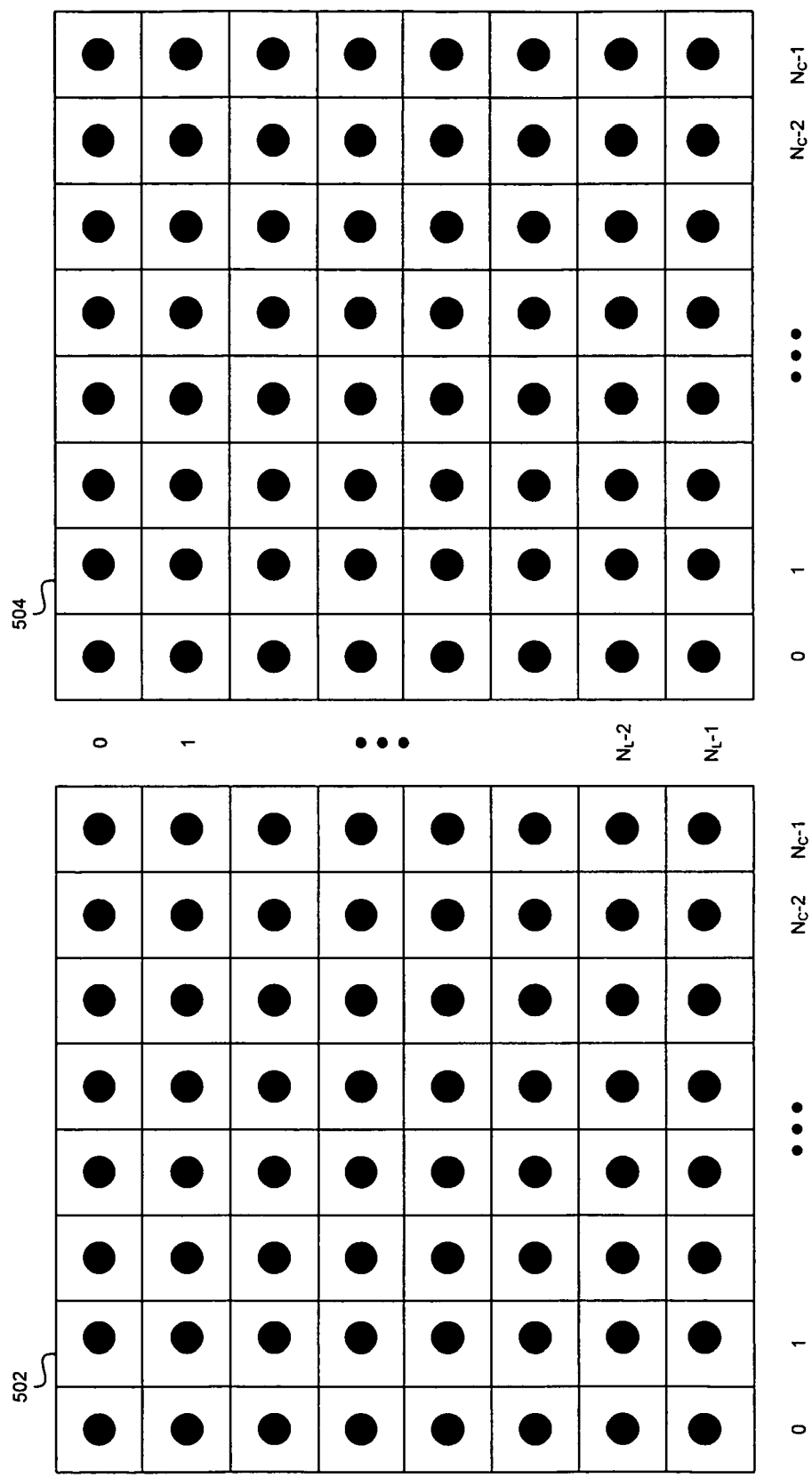
FIG. 5 is an exemplary illustration of luma and chroma samples taken for pixels located within an $N_R \times N_C$ pixel neighborhood within a video picture with 4:4:4 chroma subsampling, in connection with an embodiment of the invention.

FIG. 5 is an exemplary illustration of luma and chroma samples taken for pixels located within an $N_R \times N_C$ pixel neighborhood within a video picture with 4:4:4 chroma subsampling, in connection with an embodiment of the invention. Referring to FIG. 5, there is shown a plurality of luma samples 502, and a plurality of chroma samples 504. The pixel neighborhood comprises pixels arranged in $N_R$ rows comprising $N_C$ pixels in each row. The rows may be numbered 0, 1 ... $N_R$-2, $N_R$-1 and the columns may be numbered 0, 1 ... $N_C$-2, $N_C$-1. The plurality of luma samples 502 indicates that a luma sample may be taken for each pixel in the pixel neighborhood. The plurality of chroma samples 504 indicate that a Cb and Cr sample maybe taken for each pixel in the pixel neighborhood. Consequently, when computing the motion metrics $MM_{luma}$, $MM_{Cb}$, or $MM_{Cr}$ in equation [2] the values H=h=$N_R$ and W=w=$N_C$ may be utilized.

Figure 6:
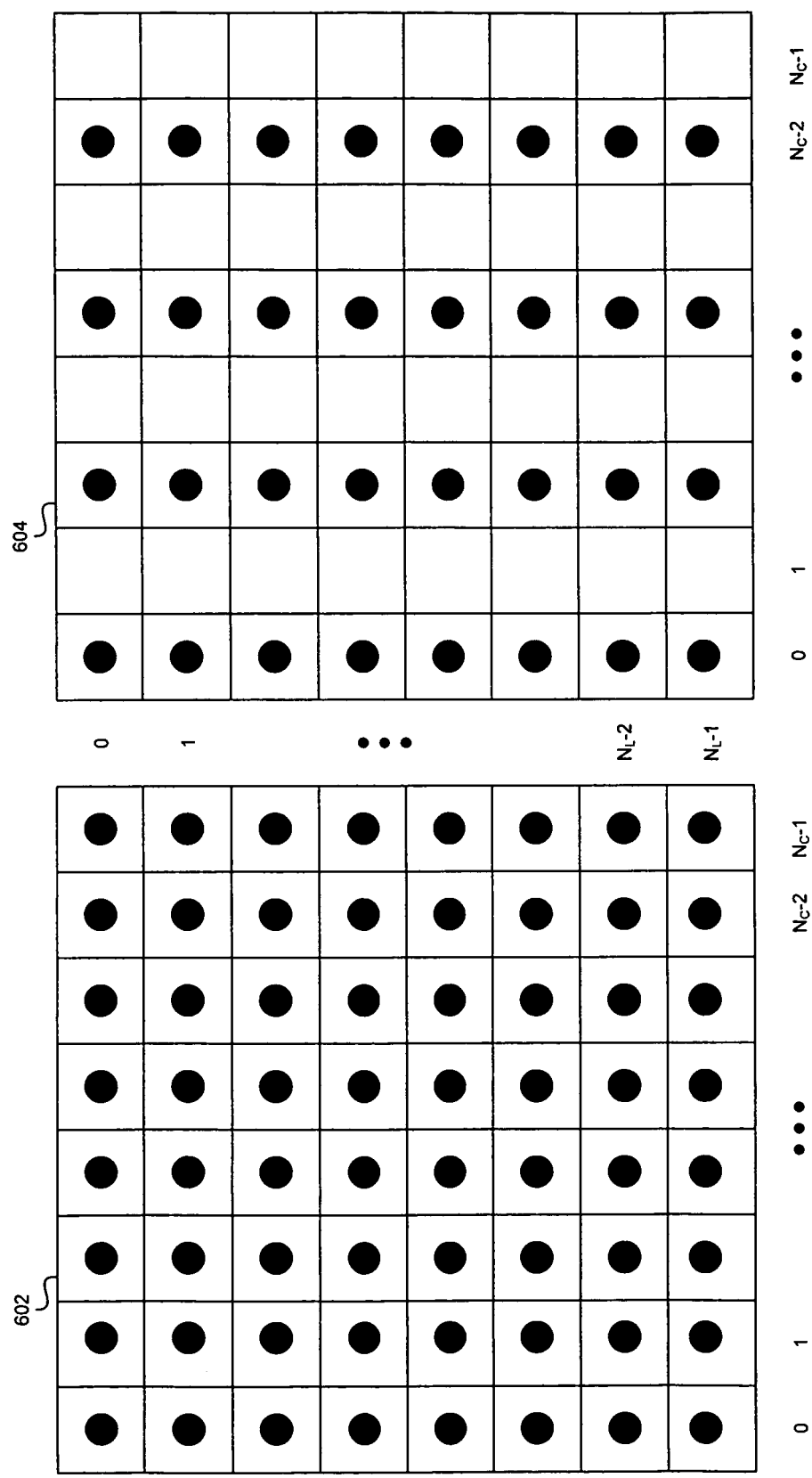
FIG. 6 is an exemplary illustration of luma and chroma samples taken for pixels located within an $N_R \times N_C$ pixel neighborhood within a video picture with 4:2:2 chroma subsampling, in connection with an embodiment of the invention.

FIG. 6 is an exemplary illustration of luma and chroma samples taken for pixels located within an $N_R \times N_C$ pixel neighborhood within a video picture with 4:2:2 chroma subsampling, in connection with an embodiment of the invention. Referring to FIG. 6, there is shown a plurality of luma samples 602, and a plurality of chroma samples 604. The pixel neighborhood comprises pixels arranged in $N_R$ rows comprising $N_C$ pixels in each row. The rows may be numbered 0, 1 ... $N_R$-2, $N_R$-1 and the columns may be numbered 0, 1 ... $N_C$-2, $N_C$-1. The plurality of luma samples 602 indicates that a luma sample may be taken for each pixel in the pixel neighborhood. The plurality of chroma samples 604 indicate that a Cb and Cr sample maybe taken for every other pixel for each line in the pixel neighborhood. Consequently, when computing the motion metric $MM_{luma}$, in equation [2] the values H=h=$N_R$ and W=w=$N_C$ may be utilized. However, when computing the motion metrics $MM_{Cb}$, or $MM_{Cr}$ in equation [2] the values H=h=$N_R$ and W=$N_C$ may be utilized. The value w=$N_C$/2 or w=($N_C$+1)/2 may be utilized.

Figure 7:
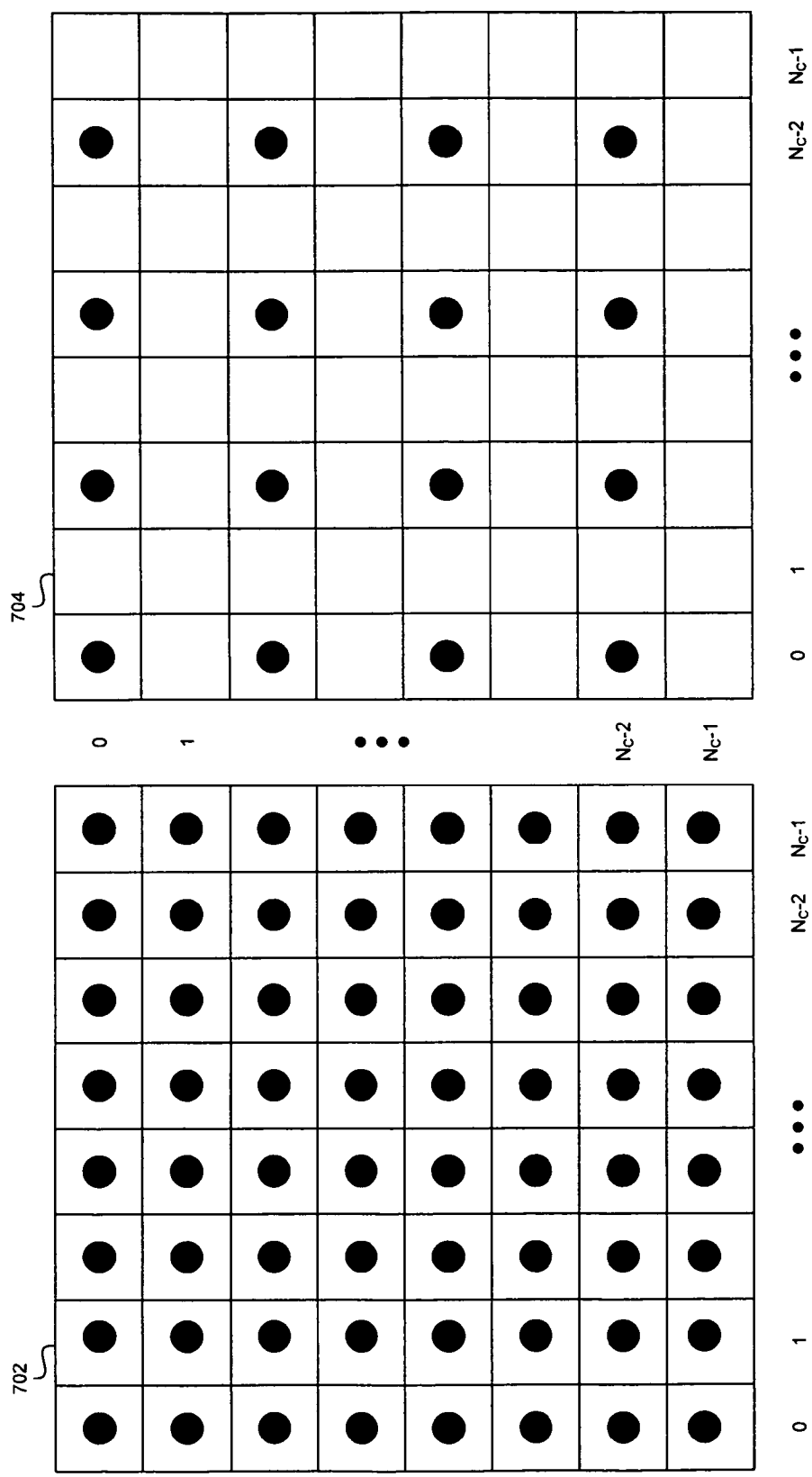
FIG. 7 is an exemplary illustration of luma and chroma samples taken for pixels located within an $N_R \times N_C$ pixel neighborhood within a video picture with 4:2:0 chroma subsampling, in connection with an embodiment of the invention.

FIG. 7 is an exemplary illustration of luma and chroma samples taken for pixels located within an $N_R \times N_C$ pixel neighborhood within a video picture with 4:2:0 chroma subsampling, in connection with an embodiment of the invention. Referring to FIG. 7, there is shown a plurality of luma samples 702, and a plurality of chroma samples 704. The pixel neighborhood comprises pixels arranged in $N_R$ rows comprising $N_C$ pixels in each row. The rows may be numbered 0, 1 ... $N_R$-2, $N_R$-1 and the columns may be numbered 0, 1 ... $N_C$-2, $N_C$-1. The plurality of luma samples 702 indicates that a luma sample may be taken for each pixel in the pixel neighborhood. The plurality of chroma samples 704 indicates that a Cb and Cr sample may be taken for every other pixel in a line and for every other line in the pixel neighborhood. Consequently, when computing the motion metric $MM_{luma}$, in equation [2] the values H=h=$N_R$ and W=w=$N_C$ may be utilized. However, when computing the motion metrics $MM_{Cb}$, or $MM_{Cr}$ in equation [2] the values H=$N_R$ and W=$N_C$ may be utilized. The values h=$N_R$/2 or h=($N_R$+1)/2, and w=$N_C$/2 or w=($N_C$+1)/2 may be utilized.

In various embodiments of the invention, an FIR blending factor $\alpha_{FIR}$ may be computed by the MM calculation block 412 based on the corresponding FIR MM, $MM_{FIR}$, based on a nonlinear relationship, such as represented in the following expression, for example:

$$\begin{cases} \alpha_{FIR} = 0 & \text{for } MM_{FIR} \leq \sqrt{K_{1,FIR}} \\ \alpha_{FIR} = K_{0,FIR}\left(1 - \dfrac{K_{1,FIR}}{MM_{FIR}^2}\right) & \text{for } \sqrt{\dfrac{K_{0,FIR}K_{1,FIR}}{K_{0,FIR}-1}} > MM_{FIR} > \sqrt{K_{1,FIR}} \\ \alpha_{FIR} = 1 & \text{for } MM_{FIR} \geq \sqrt{\dfrac{K_{0,FIR}K_{1,FIR}}{K_{0,FIR}-1}} \end{cases}$$ equation [5]

where $K_{0,FIR}$ and $K_{1,FIR}$ may represent constants that may be stored in the registers 110 in FIG. 1, for example.

The FIR NR block 414 may comprise suitable logic, circuitry, and/or code that may be adapted to generate an FIR filtered video picture. A value of a pixel located at (x,y) in the FIR filtered video picture, $P_{n,FIR}(x,y)$, may be generated based on a value of a corresponding pixel in a current video picture 204, $P_n(x,y)$, of a corresponding pixel in a preceding video picture 206, $P_{n-1}(x,y)$, and of a corresponding pixel in a subsequent video picture 202, $P_{n+1}(x,y)$. The FIR NR block 414 may be adapted to perform, for example, a 3-tap FIR filtering operation given by the expression:

$$P_{n,FIR}(x,y) = c_0 P_{n-1}(x,y) + c_1 P_n(x,y) + c_2 P_{n+1}(x,y) \quad \text{equation [6]}$$

where $c_0$, $c_1$, and $c_2$ may represent FIR filter coefficients. In this regard, the FIR filter coefficients may be stored in the registers 110 in FIG. 1, for example. The FIR NR block 414 may be adapted to generate an FIR-blended video picture. A value of a pixel located at (x,y) in a current FIR blended video picture, $P_{n,OUT\_FIR}(x,y)$, may be based on an adjusted value of a corresponding pixel located at (x,y) in the current video picture, $P_n(x,y)$, according to, for example, the following expression:

$$P_{n,OUT\_FIR}(x,y) = \alpha_{FIR} P_n(x,y) + (1-\alpha_{FIR}) P_{n,FIR}(x,y) \quad \text{equation [7]}$$

where $\alpha_{FIR}$ may represent the FIR blending factor generated by the MM calculation block 412, and $P_{n,FIR}(x,y)$ may represent an FIR filtered pixel value as calculated in equation [6].

The amount of adjustment in the pixel value $P_n(x,y)$ that may be reflected in the corresponding FIR blended pixel $P_{n,OUT\_FIR}(x,y)$ may be based on the FIR blending factor $\alpha_{FIR}$, and on the pixel value of the corresponding FIR filtered pixel $P_{n,FIR}(x,y)$. For larger values of the FIR blending factor there may be less adjustment than may be derived for smaller values of the FIR blending factor. Based on equation [2], larger amounts of detected motion among a sequence of video pictures 202, 204 and/or 206 may be reflected in larger values for the corresponding motion metric value. Based on equation [5], larger MM values may be reflected in larger values for the corresponding FIR blending factor. The value $\alpha_{FIR}$ may increase or decrease nonlinearly in response to corresponding increases or decreases in the value $MM_{FIR}$. Therefore, larger amounts of detected motion may result in less blending according to equation [7].

Figure 8:
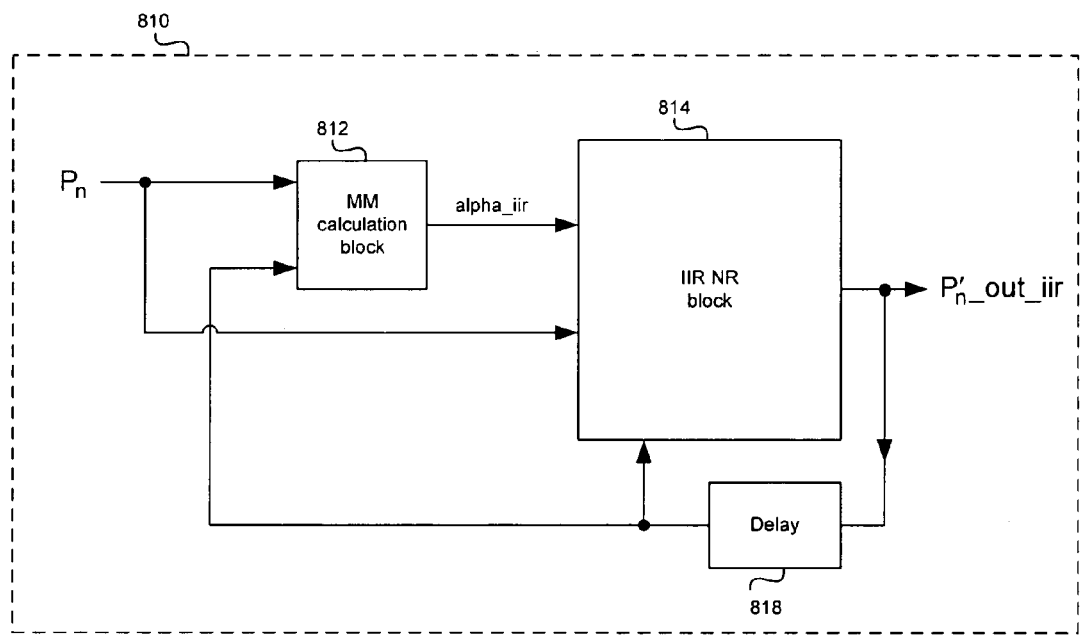
FIG. 8 is a block diagram of an exemplary infinite impulse response (IIR) blending system operating in IIR noise reduction mode, in accordance with an embodiment of the invention.

FIG. 8 is a block diagram of an exemplary infinite impulse response (IIR) blending system operating in IIR noise reduction mode, in accordance with an embodiment of the invention. Referring to FIG. 8 there is shown an IIR blending system 810 that may comprise a motion metric (MM) calculation block 812, an IIR noise reduction (IIR NR) block 814 and a delay block 818. The IIR blending system 810 may be referred to as a motion adaptive IIR NR mode system. The IIR blending system 810 may be implemented as a portion of the video processing block 102 in FIG. 1, for example. The delay block 818 may comprise suitable logic, circuitry and/or code that may be adapted to receive an output signal at a current time instant, and output the received output signal at a subsequent time instant. The MM calculation block 812 may comprise suitable logic, circuitry, and/or code that may be adapted to calculate an IIR MM. The MM calculation block 812 may utilize the calculated IIR MM to compute an IIR blending factor, $\alpha_{IIR}$.

The MM calculation block 812 may compute an IIR MM. For example, an IIR MM based on pixel values P may be computed in accordance with the following expression:

$$MM(x,y) = \frac{1}{h \cdot w} \sum_{i=-\frac{H-1}{2}}^{\frac{H-1}{2}} \sum_{j=-\frac{W-1}{2}}^{\frac{W-1}{2}} |P_n(i+x, j+y) - P'_{n-1}(i+x, j+y)| \quad \text{equation [8]}$$

where the tuple (x,y) may define the neighborhood of the corresponding transform window, MM(x,y) may represent the motion metric computed at the neighborhood, w may represent a number of pixels in a row within the transform window, h may represent a number of pixels in a column within the transform window, H may represent a number of rows in the neighborhood, W may represent a number of pixels in a row in the neighborhood, and the indexes i and j may represent pixel offsets in the vertical and horizontal directions, respectively, relative to the pixel located at (x, y). $P_n(i+x, j+y)$ may represent a value of a pixel located at (i+x, j+y) in a current video picture 204, and $P'_{n-1}(i+x, j+y)$ may represent a value of a corresponding pixel located at (i+x, j+y) in a preceding IIR blended video picture. The pixel value $P'_{n-1}$ may represent feedback output. The feedback output may comprise a version of output from the IIR NR block 814 that was time delayed by the delay block 818. The feedback output may be based on one or more preceding video pictures 206. The current video picture, and preceding IIR video picture may be of the same type in equation [8].

A pixel value P may represent a luma pixel value, a Cb or color difference B-Y pixel value, or a Cr or color difference R-Y pixel value. In each case a corresponding $MM_{luma}$, $MM_{Cb}$, or $MM_{Cr}$ may be computed. A final motion metric may be computed based on a weighted average sum of the respective motion metrics. For example, for an IIR NR mode, an $MM_{IIR}$ may be computed by the MM calculation block 812 according to the following expression:

$$MM_{IIR} = c_0 MM_{luma} + c_1 MM_{Cb} + c_2 MM_{Cr} \quad \text{equation [9]}$$

and $$c_0 + c_1 + c_2 = 1 \quad \text{equation [10]}$$

where $c_0$, $c_1$, and $c_2$ may represent constants that may be stored in the registers 110 in FIG. 1, for example.

In various embodiments of the invention, an IIR blending factor $\alpha_{IIR}$ may be computed by the MM calculation block 812 based on the corresponding IIR MM, $MM_{IIR}$, based on a nonlinear relationship, such as represented in the following expression, for example:

$$\begin{cases} \alpha_{IIR} = 0 & \text{for } MM_{IIR} \leq \sqrt{K_{1,IIR}} \\ \alpha_{IIR} = K_{0,IIR}\left(1 - \frac{K_{1,IIR}}{MM_{IIR}^2}\right) & \text{for } \sqrt{\frac{K_{0,IIR} K_{1,IIR}}{K_{0,IIR} - 1}} > \\ & MM_{IIR} > \sqrt{K_{1,IIR}} \\ \alpha_{IIR} = 1 & \text{for } MM_{IIR} \geq \sqrt{\frac{K_{0,IIR} K_{1,IIR}}{K_{0,IIR} - 1}} \end{cases}$$

equation [11]

where $K_{0,IIR}$ and $K_{1,IIR}$ may represent constants that may be stored in the registers 110 in FIG. 1, for example.

The IIR NR block 814 may comprise suitable logic, circuitry, and/or code that may be adapted to generate an IIR blended video picture. A value of a pixel located at (x,y) in the IIR blended video picture, $P_{n,OUT\_IIR}(x,y)$, may be generated based on a value of a corresponding pixel in a current video picture 204, $P_n(x,y)$, and of a corresponding pixel in a preceding IIR blended video picture $P'_{n-1}(x,y)$. A value of a pixel located at (x,y) in a current IIR blended video picture, $P_{n,OUT\_IIR}(x,y)$, may be based on an adjusted value of a corresponding pixel located at (x,y) in the current video picture, $P_n(x,y)$, according to, for example, the following expression:

$$P_{n,OUT\_IIR}(x,y) = \alpha_{IIR} P_n(x,y) + (1-\alpha_{IIR}) P'_{n-1}(x,y) \quad \text{equation [12]}$$

where $\alpha_{IIR}$ may represent the IIR blending factor generated by the MM calculation block 812, and $P'_{n-1}(x,y)$ may represent the time delayed feedback output from the IIR NR block 814.

The amount of adjustment in the pixel value $P_n(x,y)$ that may be reflected in the corresponding IIR blended pixel $P_{n,OUT\_IIR}(x,y)$ may be based on the IIR blending factor $\alpha_{IIR}$, and on the pixel value of the corresponding preceding IIR blended pixel $P'_{n-1}(x,y)$.

Figure 9:
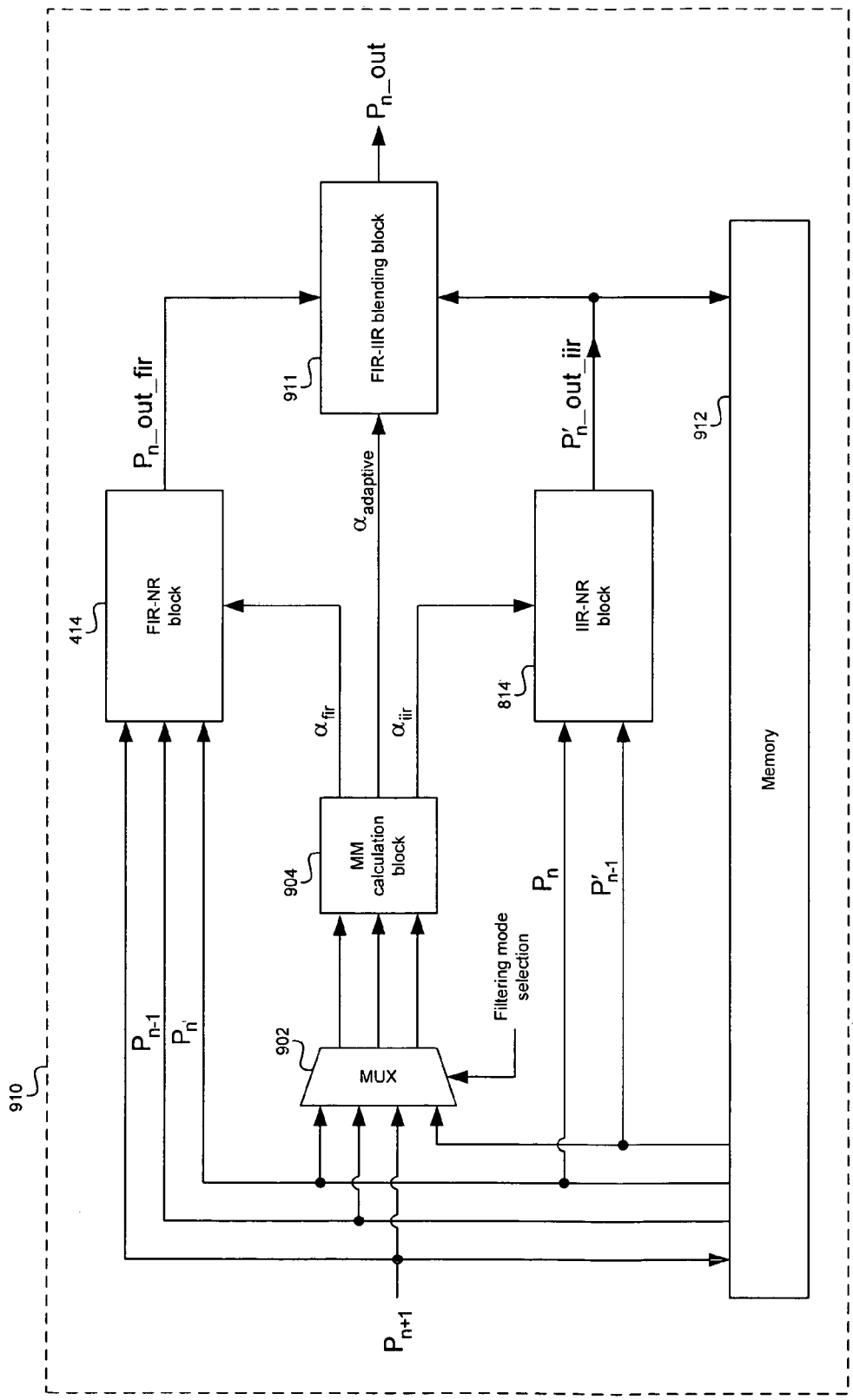
FIG. 9 is a block diagram of an exemplary adaptive blending system with frame store operating in adaptive noise reduction mode, in accordance with an embodiment of the invention.

FIG. 9 is a block diagram of an exemplary adaptive blending system with frame store operating in adaptive noise reduction mode, in accordance with an embodiment of the invention. Referring to FIG. 9, there is shown an adaptive blending system 910. The adaptive blending system 910 may comprise a multiplexer (MUX) 902, an MM calculation block 904, an FIR NR block 414, an IIR NR block 814, an adaptive NR blending block 911, and memory 912. The adaptive blending system 910 may be implemented as a portion of the video processing block 102 in FIG. 1, for example.

The MUX 902 may comprise suitable logic, circuitry, and/or code that may be adapted to select inputs to the MM calculation block 904 in accordance with an NR mode, for example an FIR NR mode, IIR NR mode, and/or adaptive NR mode. The MUX 902 may be adapted to select at least one value of a pixel from a preceding video picture, $P_{n-1}$, at least one value of a corresponding pixel from a current video picture, $P_n$, and at least one value of a corresponding pixel from a subsequent video picture, $P_{n+1}$, when an FIR NR mode is selected. The MUX 902 may be adapted to select at least one value of a pixel from the current video picture, $P_n$, and at least one value of a corresponding pixel from a preceding IIR blended video picture, $P'_{n-1}$, when an IIR NR mode is selected. When an adaptive NR mode is selected, the MUX 902 may be adapted to first select at least one value of a corresponding pixel from a current video picture, $P_n$, at least one value of a corresponding pixel from a subsequent video picture, $P_{n+1}$, and at least one value of a corresponding pixel from a preceding IIR blended video picture, $P'_{n-1}$.

The memory 912 may comprise suitable logic circuitry and/or code that may be adapted to store at least a portion of video pictures received from video input and/or stored as a processed intermediate result. Stored video pictures, or portions thereof, may be retrieved from the memory 912 and utilized by the MM calculation block 412 and/or the FIR NR block 414 and/or the IIR NR block 814. For example, a current video picture, $P_n$, and/or a preceding video picture, $P_{n-1}$, and/or a preceding IIR blended video picture, $P'_{n-1}$, may be retrieved from the memory 912. A subsequent video picture, $P_{n+1}$, and/or a current IIR blended video picture, $P'_{n\_out\_iir}$, may be stored in the memory 912.

The MM calculation block 904 may comprise suitable logic, circuitry, and/or code that may be adapted to calculate an adaptive MM. The MM calculation block 904 may utilize the calculated adaptive MM to compute an adaptive blending factor, $\alpha_{BLEND}$.

The MM calculation block 904 may compute an adaptive MM. For example, an adaptive MM based on pixel values P may be computed in accordance with the following expression:

$$MM(x,y) = \frac{1}{h \cdot w} \sum_{i=-\frac{H-1}{2}}^{\frac{H-1}{2}} \sum_{j=-\frac{W-1}{2}}^{\frac{W-1}{2}} [|P_n(i+x, j+y) - P'_{n-1}(i+x, j+y)| + \\ |P_n(i+x, j+y) - P_{n+1}(i+x, j+y)|] \quad \text{equation [13]}$$

where the tuple (x,y) may define the neighborhood of the corresponding transform window, MM(x,y) may represent the motion metric computed at the neighborhood, w may represent a number of pixels in a row within the transform window, and h may represent a number of pixels in a column within the transform window. H may represent a number of rows in the neighborhood, W may represent a number of columns in the neighborhood, and the indexes i and j may represent pixel offsets in the vertical and horizontal directions, respectively, relative to the pixel located at (x, y). $P_n(i+x,j+y)$ may represent a value of a pixel located at (i+x,j+y) in a current video picture 204, $P_{n+1}(i+x,j+y)$ may represent a value of a pixel located at (i+x,j+y) in a subsequent video picture 202, and $P'_{n-1}(i+x,j+y)$ may represent a value of a corresponding pixel located at (i+x,j+y) in a preceding IIR blended video picture. The pixel value $P'_{n-1}$ may represent feedback output. The feedback output may comprise a delayed version of output from the IIR NR block 814 that was time delayed by the memory 912. The feedback output may be based on one or more preceding video pictures 206. The current video picture, subsequent video picture and preceding IIR video picture may be of the same type in equation [13].

A pixel value P may represent a luma pixel value, a Cb or color difference B-Y pixel value, or a Cr or color difference R-Y pixel value. In each case a corresponding $MM_{luma}$, $MM_{Cb}$, or $MM_{Cr}$ may be computed. A final motion metric may be computed based on a weighted average sum of the respective motion metrics. For example, for an adaptive NR mode, an $MM_{BLEND}$ may be computed by the MM calculation block 904 according to the following expression:

$$MM_{BLEND}=c_0 MM_{luma}+c_1 MM_{Cb}+c_2 MM_{Cr} \qquad \text{equation [14]}$$

and $$c_0+c_1+c_2=1 \qquad \text{equation [15]}$$

where $c_0$, $c_1$, and $c_2$ may represent constants that may be stored in the registers 110 in FIG. 1, for example.

In various embodiments of the invention, an adaptive blending factor $\alpha_{BLEND}$ may be computed by the MM calculation block 904 based on the corresponding adaptive MM, $MM_{BLEND}$, based on a nonlinear relationship, such as represented in the following expression, for example:

$$\begin{cases} \alpha_{BLEND} = 0 & \text{for } MM_{BLEND} \leq \sqrt{K_{1,BLEND}} \\ \alpha_{BLEND} = K_{0,BLEND}\left(1 - \dfrac{K_{1,BLEND}}{MM_{BLEND}^2}\right) & \text{for } \sqrt{\dfrac{K_{0,BLEND} K_{1,BLEND}}{K_{0,BLEND} - 1}} > MM_{BLEND} > \sqrt{K_{1,BLEND}} \\ \alpha_{BLEND} = 1 & \text{for } MM_{BLEND} \geq \sqrt{\dfrac{K_{0,BLEND} K_{1,BLEND}}{K_{0,BLEND} - 1}} \end{cases} \qquad \text{equation [16]}$$

where $K_{0,BLEND}$ and $K_{1,BLEND}$ may represent constants that may be stored in the registers 110 in FIG. 1, for example.

The adaptive NR blending block 911 may comprise suitable logic, circuitry, and/or code that may be adapted to generate an adaptive blended video picture. A value of a pixel located at (x,y) in a current adaptive blended video picture, $P_{n,OUT}(x,y)$, may be generated based on a value of a corresponding pixel in a current FIR blended video picture, $P_{n,OUT\_FIR}(x,y)$, and of a corresponding pixel in a current IIR blended video picture $P_{n,OUT\_IIR}(x,y)$. A value of a pixel located at (x,y) in a current adaptive blended video picture, $P_{n,OUT}(x,y)$, may be based on a value of a corresponding pixel located at (x,y) in the current FIR blended video picture, $P_{n,OUT\_FIR}(x,y)$, and in the current IIR blended video picture $P_{n,OUT\_IIR}(x,y)$ according to, for example, the following expression:

$$P_{n,OUT}(x,y)=\alpha_{BLEND} P_{n,OUT\_FIR}(x,y)+(1-\alpha_{BLEND})P_{n,OUT\_IIR}(x,y) \qquad \text{equation [17]}$$

where $\alpha_{BLEND}$ may represent the adaptive blending factor generated by the MM calculation block 904.

For larger values of the adaptive blending factor, a value of a pixel in the adaptive blended video picture may be approximately equal to a value of a corresponding pixel in the FIR blended video picture. For smaller values of the adaptive blending factor, a value of a pixel in the adaptive blended video picture may be approximately equal to a value of a corresponding pixel in the IIR blended video picture.

In various embodiments of the invention, the adaptive blending factor may control the contributions of the FIR blended video picture and the IIR blended video picture to the output adaptive blended video picture. When a larger amount of motion is detected among a sequence of video pictures 202, 204 and/or 206 the blended video picture may reflect a correspondingly larger contribution from the FIR blended video picture. When a comparatively small amount of motion is detected, the output adaptive blended video picture may reflect a correspondingly larger contribution from the IIR blended video picture.

Figure 10:
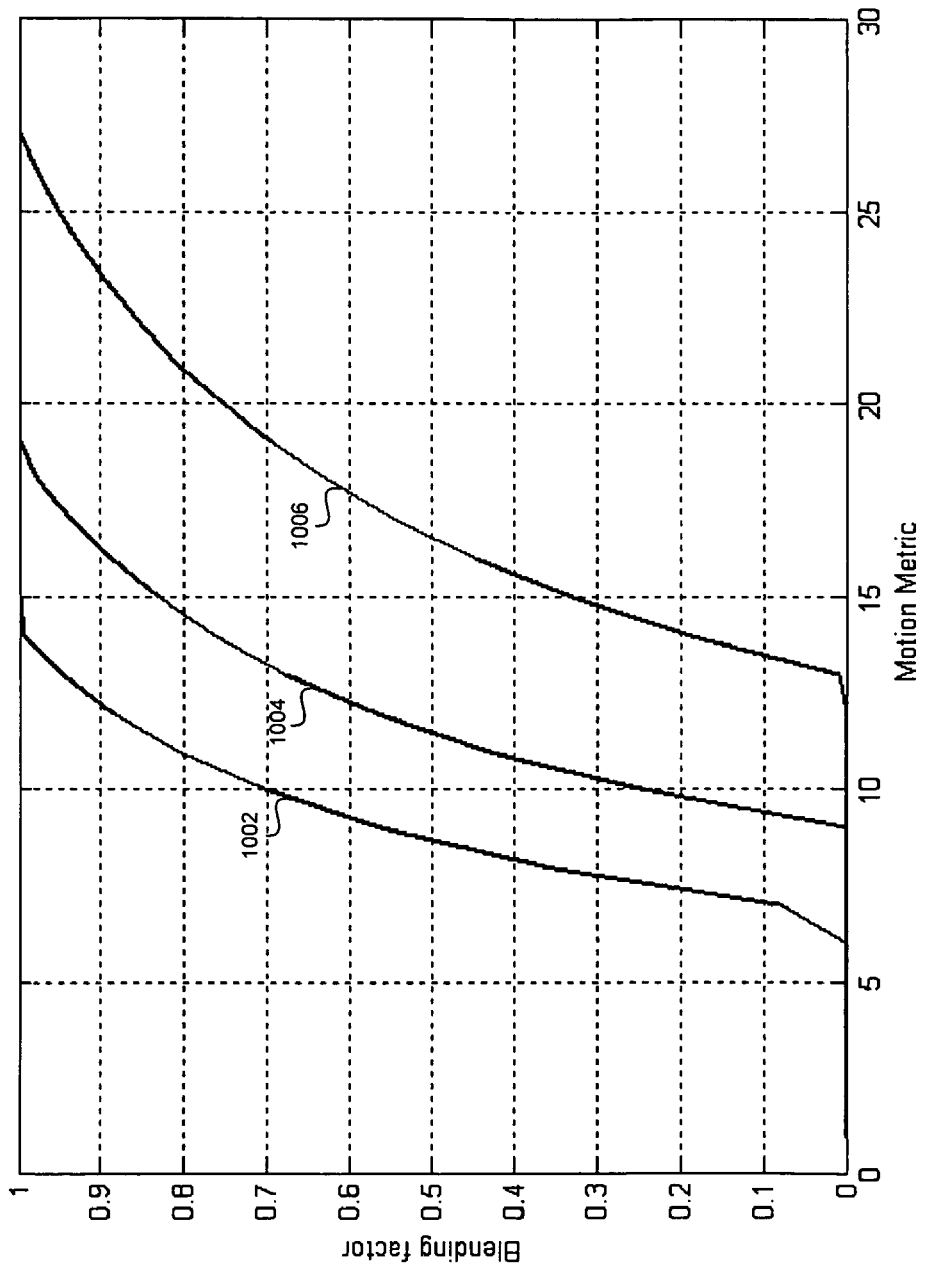
FIG. 10 is an exemplary graph illustrating blending factor values and corresponding motion metric values, in accordance with an embodiment of the invention.

FIG. 10 is an exemplary graph illustrating blending factor values and corresponding motion metric values, in accordance with an embodiment of the invention. Referring to FIG. 10, there is shown a graph of adaptive blending factor values 1002, a graph of IIR blending factor values 1004 and a graph of FIR blending factor values 1006. The adaptive blending factor graph 1002 may reflect values for the constants $K_{0,BLEND}=1.3$ and $K_{1,BLEND}=46$. The IIR blending factor graph 1004 may reflect values for the constants $K_{0,BLEND}=1.3$ and $K_{1,BLEND}=81$. The FIR blending factor graph 1002 may reflect values for the constants $K_{0,BLEND}=1.3$ and $K_{1,BLEND}=168$. Because of the nonlinearity in the relationship between the blending factors and the motion metric, as reflected in graphs 1002, 1004 and/or 1006, for small values of $\alpha_{FIR}$, $\alpha_{FIR}$, or $\alpha_{FIR}$, the values of the blending factors may vary quickly with changes in values of the motion metric in comparison to some conventional NR algorithms in which the value of the blending factor may be linearly proportional to the motion metric value. As a result, in various embodiments of the invention output video pictures may be generated while avoiding the displaying of artifacts that may reduce video quality for moving objects. Examples of such artifacts may be observed in the display as motion blurriness or motion trails in sequences of video pictures.

The ability to detect motion of pixels or objects in a sequence of video pictures may be enhanced by computing an adjusted motion metric. A corresponding adjusted motion metric may be computed by deriving an adjustment term and from the computation of the motion metric using equation [13]. Corresponding luma, and chroma adjusted motion metrics may be computed and a corresponding adjusted metric may be computed for the adaptive blending mode. The adjusted motion metric may be computed by computing a first content value, content_value$^0$, and a second content value, content_value$^1$. Each content value may be derived by computing a corresponding right sum, Ssum_right$^k$, left sum, Ssum_left$^k$, upper sum, Ssum_upper$^k$, and lower sum, Ssum_lower$^k$. The value k=0 may indicate a sum associated with the first content value, or the value k=1 may indicate a sum associated with the second content value.

For example, for the adaptive NR mode, when computing the first content value, content_value$^0$, the sums may be computed based on the following exemplary expressions:

$$Ssum\_right^0(x, y) = \sum_{i=-\frac{H-1}{2}}^{\frac{H-1}{2}} \sum_{j=1}^{\frac{W-1}{2}} [P_n(i+x, j+y) - P'_{n-1}(i+x, j+y)] \quad \text{equation [18]}$$

$$Ssum\_left^0(x, y) = \sum_{i=-\frac{H-1}{2}}^{\frac{H-1}{2}} \sum_{j=-\frac{W-1}{2}}^{-1} [P_n(i+x, j+y) - P'_{n-1}(i+x, j+y)] \quad \text{equation [19]}$$

$$Ssum\_lower^0(x, y) = \sum_{i=1}^{\frac{H-1}{2}} \sum_{j=-\frac{W-1}{2}}^{\frac{W-1}{2}} [P_n(i+x, j+y) - P'_{n-1}(i+x, j+y)] \quad \text{equation [20]}$$

$$Ssum\_upper^0(x, y) = \sum_{i=-\frac{H-1}{2}}^{-1} \sum_{j=-\frac{W-1}{2}}^{\frac{W-1}{2}} [P_n(i+x, j+y) - P'_{n-1}(i+x, j+y)] \quad \text{equation [21]}$$

where left, right, upper and lower may be defined in relation to a center pixel in the H×W pixel neighborhood for odd numbered values of H and W. The equations [18]-[21] may be adjusted for even numbered values of H and W. The tuple (x,y) may define the neighborhood of the corresponding transform window, Ssum_right(x,y), Ssum_left(x,y), Ssum_lower(x,y) and Ssum_upper(x,y) may represent the right, left, lower and upper sums, respectively, computed at corresponding portions of the neighborhood. w may represent a number of pixels in a row within the transform window, h may represent a number of pixels in a column within the transform window. H may represent a number of rows in the neighborhood, W may represent a number of columns in the neighborhood and the indexes i and j may represent pixel offsets in the vertical and horizontal directions, respectively, relative to the pixel located at (x, y). $P_n(i+x,j+y)$ may represent a value of a pixel located at (i+x,j+y) in a current video picture 204, and $P'_{n-1}(i+x,j+y)$ may represent a value of a corresponding pixel located at (i+x,j+y) in a preceding IIR blended video picture. For the FIR-NR mode, the equations [18]-[21] may be modified. For example, the picture $P_{n-1}$ may replace $P'_{n-1}$ in the modified equations. For the IIR-NR mode, the equations from [18]-[21] may be used.

The value of the first content value content_value$^0$ may be derived, for example, by determining the maximum absolute value among the left, right, upper and lower sums as in the following expression:

$$content\_value^0(x,y) = \max(|Ssum\_right^0|, |Ssum\_left^0|, |Ssum\_lower^0|, |Ssum\_upper^0|) \quad \text{equation [22]}$$

For example, for the adaptive NR mode, when computing the second content value, content_value$^1$, the sums may be computed based on the following expressions:

$$Ssum\_right^1(x, y) = \sum_{i=-\frac{H-1}{2}}^{\frac{H-1}{2}} \sum_{j=1}^{\frac{W-1}{2}} [P_n(i+x, j+y) - P_{n+1}(i+x, j+y)] \quad \text{equation [23]}$$

-continued $$Ssum\_left^1(x, y) = \sum_{i=-\frac{H-1}{2}}^{\frac{H-1}{2}} \sum_{j=-\frac{W-1}{2}}^{-1} [P_n(i+x, j+y) - P_{n+1}(i+x, j+y)] \quad \text{equation [24]}$$

$$Ssum\_lower^1(x, y) = \sum_{i=1}^{\frac{H-1}{2}} \sum_{j=-\frac{W-1}{2}}^{\frac{W-1}{2}} [P_n(i+x, j+y) - P_{n+1}(i+x, j+y)] \quad \text{equation [25]}$$

$$Ssum\_upper^1(x, y) = \sum_{i=-\frac{H-1}{2}}^{-1} \sum_{j=-\frac{W-1}{2}}^{\frac{W-1}{2}} [P_n(i+x, j+y) - P_{n+1}(i+x, j+y)] \quad \text{equation [26]}$$

where $P_{n+1}(i+x,j+y)$ may represent a value of a pixel located at (i+x,j+y) in a subsequent video picture 202. For the IIR-NR mode, the equations [23]-[26] may be omitted and the corresponding second content values set equal to 0. For the FIR-NR mode, the equations [23]-[26] may be used.

The value of the second content value content_value$^1$ may be derived, for example, by determining the maximum absolute value among the left, right, upper and lower sums as in the following expression:

$$content\_value^1(x,y) = \max(|Ssum\_right^1|, |Ssum\_left^1|, |Ssum\_lower^1|, |Ssum\_upper^1|) \quad \text{equation [27]}$$

The final content value, content_value, may be derived, for example, by determining the maximum value among the first and second content values as in the following expression:

$$content\_value(x,y) = \max(content\_value^0(x,y), content\_value^1(x,y)) \quad \text{equation [28]}$$

The values of pixels utilized when computing right, left, lower and upper sums, and content values may comprise luma values, or chroma values Cb and/or Cr. Consequently, content values, as in equation [28], may be computed individually for luma, Cb and Cr values. The individual content values for luma, Cb and/or Cr may be combined to compute a composite content value content_value_YC, for example, as in the following equation:

$$content\_value\_YC(x,y) = \max(content\_value\_Y(x,y), content\_value\_Cb(x,y), content\_value\_Cb(x,y)) \quad \text{equation [29]}$$

where content_value_Y, content_value_Cb and content_value_Cr may represent content values for luma, Cb, and Cr respectively. Alternatively, content_value_YC may be computed as in the following equation, for example:

$$content\_value\_YC(x,y) = k_1 content\_value\_Y(x,y) + k_2 content\_value\_Cb(x,y) + k_3 content\_value\_Cr(x,y) \quad \text{equation [30]}$$

and $$k_1 + k_2 + k_3 = 1 \quad \text{equation [31]}$$

where $k_1$, $k_2$ and $k_3$ may represent constants that may be stored in the registers 110 in FIG. 1, for example.

The adjusted motion metric, AMM(x,y), may be defined, for example, in the following equation:

$$AMM(x,y) = MM(x,y) + k^* content\_value\_YC(x,y) \quad \text{equation [32]}$$

where MM(x,y) may be the motion metric as defined in equation [14], and k may represent a constant that may be stored in the registers 110, for example.

The corresponding adjusted blending factor, Aα, may be computed, for example, as in the following equation:

$$\begin{cases} A\alpha = 0 & \text{for } AMM(x, y) \leq \sqrt{K_1} \\ A\alpha = K_0\left(1 - \dfrac{K_1}{AMM(x, y)^2}\right) & \text{for } \sqrt{\dfrac{K_0 K_1}{K_0 - 1}} > AMM(x, y) > \sqrt{K_1} \\ A\alpha = 1 & \text{for } AMM(x, y) \geq \sqrt{\dfrac{K_0 K_1}{K_0 - 1}} \end{cases} \quad \text{equation [33]}$$

where $K_0$ and $K_1$ may represent constants that may be stored in the registers 110 in FIG. 1, for example.

The adjusted blending factor may be utilized to compute a value of a pixel in a current adaptive blended video picture, $P_{n,OUT}(x,y)$, based on a value of a corresponding pixel located at (x,y) in the current FIR blended video picture, $P_{n,OUT\_FIR}(x,y)$, and in the current IIR blended video picture $P_{n,OUT\_IIR}(x,y)$ according to, for example, the following expression:

$$P_{n,OUT}(x,y) = A\alpha_{BLEND} P_{n,OUT\_FIR}(x,y) + (1 - A\alpha_{BLEND}) P_{n,OUT\_IIR}(x,y) \quad \text{equation [34]}$$

where $A\alpha_{BLEND}$ may represent an adjusted adaptive blending factor generated by the MM calculation block 904.

The blending factors $\alpha_{FIR}$ and $\alpha_{IIR}$ may also be computed based on the adjusted motion metric AMM computed by equation [33] with the corresponding parameters $K_0$ and $K_1$. The computations of $P_{n,OUT\_FIR}(x,y)$ by block 414 and $P_{n,OUT\_IIR}(x,y)$ by block 814 may then be performed as $$P_{n,OUT\_FIR}(x,y) = A\alpha_{FIR} P_n(x,y) + (1 - A\alpha_{FIR}) P_{n,FIR}(x,y) \quad \text{equation (35)}$$

and $$P_{n,OUT\_IIR}(x,y) = A\alpha_{IIR} P_n(x,y) + (1 - A\alpha_{IIR}) P'_{n-1}(x,y) \quad \text{equation (36)}$$

where $A\alpha_{FIR}$ and $A\alpha_{IIR}$ may represent the adjusted blending factors generated by block 904.

Figure 11:
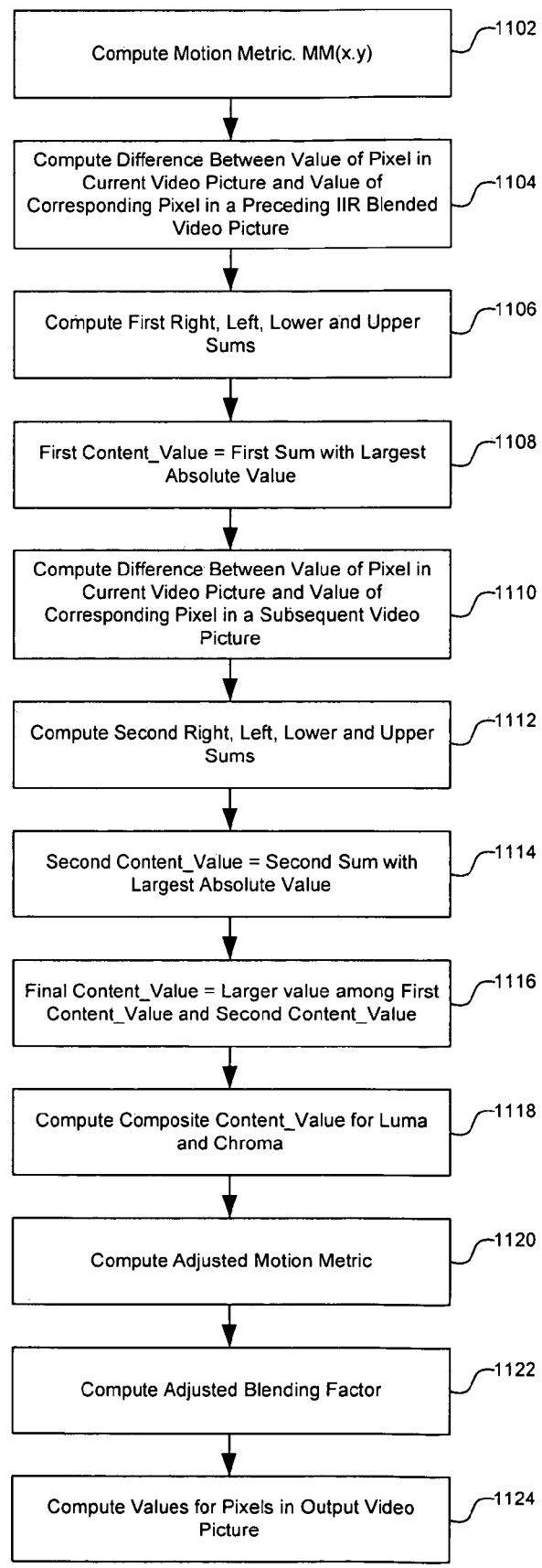
FIG. 11 is a flow diagram with exemplary steps illustrating the operation of a motion adaptive noise reduction system with moving content detection, in accordance with an embodiment of the invention.

FIG. 11 is a flow diagram with exemplary steps illustrating the operation of a motion adaptive noise reduction system with moving content detection, in accordance with an embodiment of the invention. Referring to FIG. 11, in step 1102 a motion metric may be computed. In step 1104, an IIR blended difference may be computed comprising a difference between a value of a pixel in a current video picture and a value of a corresponding pixel in a preceding IIR blended video picture. In step 1106, first sums may be computed comprising a right sum, left sum, lower sum and upper sum. In step 1108, a first content_value may be derived by determining the first sum, computed in step 1106, with the largest absolute value.

In step 1110, a leading difference may be computed comprising a difference between a value of a pixel in the current video picture and a value of a corresponding pixel in a subsequent video picture. In step 1112, second sums may be computed comprising a right sum, left sum, lower sum and upper sum. In step 1114, a computed second content_value may be derived by determining the second sum, computed in step 1112, with the largest absolute value. In step 1116, a final content_value may be equal in value to the larger of the first content_value and second content_value. In step 1118, a composite content_value may be derived by combining content_values for luma and chroma values. In step 1120, the motion metric, computed in step 1102, may be adjusted to compute an adjusted motion metric. In step 1122, the adjusted motion metric may be utilized to compute the adjusted blending factors. In step 1124, the adjusted blending factors may be utilized to compute values for pixels in an output video picture.

Various embodiments of the invention may also be utilized for other video processing tasks, such as motion compensated temporal filtering (MCTF) noise reduction. Various embodiments of the invention are not limited to a nonlinear relationship between a blending factor and a corresponding motion metric as described in equations [5], [11] and/or [16]. The values of the blending factors may not be limited to a range between 0 and 1, but may be adapted to other value ranges according to the video processing task being performed. The method for computing the motion metric may not be limited to an average of absolute values of differences, as in equations [2], [8] and [13]. For example, an alternative method for computing MM values may utilize computing average square value of differences. The method for computing right, left, lower and upper sums may not be limited to the method as in equations [18]-[21] or equations [23]-[26]. For example, an alternative method for computing sums may be to divide the pixel neighborhood into quadrants comprising, for example, an upper left, upper right, lower left, and lower right quadrant.

Aspects of a system for processing images may include circuitry within a chip that determines a motion metric that indicates an amount of motion between a current video picture and at least one of the following: at least one preceding video picture and at least one subsequent video picture. The motion metric may be computed from a maximum value derived by summing, over a plurality of corresponding pixels that are located within a region around a reference pixel in a current video picture, differences in values of the plurality of corresponding pixels. The circuitry within the chip may also compute a blending factor that has a nonlinear relationship to the motion metric. The circuitry within the chip may adjust at least one pixel in the current video picture based on the computed blending factor. The current video picture, one or more preceding video pictures, and one or more subsequent video pictures may be a video frame, or a video field.

The circuitry within the chip may compute the motion metric by determining a maximum value that includes a right sum, a left sum, an upper sum and a lower sum. The right sum, left sum, upper sum and/or lower sum may be computed over a plurality of pixels that are located within the region relative to a location of the reference pixel. The circuitry within the chip may compute a first right sum based on a sum, computed by adding, over the plurality of pixels that are located to the right of the reference pixel, a value of a difference in at least one pixel value of the current video picture and a corresponding at least one pixel value of one preceding picture or one feedback output that may include an IIR blended video picture. A second said right sum may be computed based on a sum, computed by adding, over the plurality of pixels that are located to the right of the reference pixel, a value of a difference in at least one pixel value of the current video picture and a corresponding at least one pixel value of at least one subsequent video picture.

The circuitry within the chip may compute a first left sum based on a sum computed by adding, over the plurality of pixels that are located to the left of the reference pixel, a value of a difference in at least one pixel value of the current video picture and a corresponding at least one pixel value of one preceding picture or one feedback output that may include an IIR blended video picture. A second said left sum may be computed based on a sum, computed by adding, over the plurality of pixels that are located to the left of the reference pixel, a value of a difference in at least one pixel value of the current video picture and a corresponding at least one pixel value of at least one subsequent video picture.

The circuitry within the chip may compute a first upper sum based on a sum computed by adding, over the plurality of pixels that are located above the reference pixel, a value of a difference in at least one pixel value of the current video picture and a corresponding at least one pixel value of one preceding picture or one feedback output that may include an IIR blended video picture. A second said upper sum may be computed based on a sum, computed by adding, over the plurality of pixels that are located above the reference pixel, a value of a difference in at least one pixel value of the current video picture and a corresponding at least one pixel value of at least one subsequent video picture.

The circuitry within the chip may compute a lower right sum based on a sum computed by adding, over the plurality of pixels that are located below the reference pixel, a value of a difference in at least one pixel value of the current video picture and a corresponding at least one pixel value of one preceding picture or one feedback output that may include an IIR blended video picture. A second said lower sum may be computed based on a sum, computed by adding, over the plurality of pixels that are located below the reference pixel, a value of a difference in at least one pixel value of the current video picture and a corresponding at least one pixel value of at least one subsequent video picture.

Various embodiments of the invention may be realized in a machine-readable storage having stored thereon, a computer program having at least one code for handling analog signals in video systems, the at least one code section being executable by a machine that may cause the machine to perform steps comprising determining a motion metric that indicates an amount of motion between a current video picture and at least one preceding video picture and/or at least one subsequent video picture. The motion metric may be computed from a maximum value derived by summing, over a plurality of corresponding pixels that may be located within a region around a reference pixel in a current video picture, differences in values of the plurality of corresponding pixels. A blending factor may be computed comprising a nonlinear relationship to the motion metric. At least one pixel in the current video picture maybe adjusted based on the computed blending factor.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present, invention not be limited to the particular embodiment disclosed, but that the present invention will include all embodiments falling within the scope of the appended claims.

What is claimed is:

1. A method for processing images, the method comprising:
   determining a motion metric that indicates an amount of motion between a current video picture and at least one of the following: at least one preceding video picture and at least one subsequent video picture; wherein said motion metric is computed from a maximum value derived by summing over a plurality of corresponding pixels that are located within a region around a reference pixel in a current video picture, differences in values of said plurality of corresponding pixels;
   computing a blending factor comprising a nonlinear relationship to said motion metric; and
   adjusting at least one pixel in said current video picture based on said computed blending factor.

2. The method according to claim 1, wherein at least one of the following: said current video picture, said at least one preceding video picture, and said at least one subsequent video picture is at least one of the following: a video frame, and a video field.

3. The method according to claim 1, further comprising computing said motion metric by determining a maximum value comprising a right sum, a left sum, an upper sum and a lower sum.

4. The method according to claim 3, wherein at least one of the following: said right sum, said left sum, said upper sum and said lower sum, is computed over a plurality of pixels that are located within said region relative to a location of said reference pixel.

5. The method according to claim 4, further comprising computing a first said right sum based on a sum, computed by adding, over said plurality of pixels that are located to the right of said reference pixel, a value of a difference in at least one pixel value of said current video picture and a corresponding at least one pixel value of at least one of the following: at least one preceding video picture and feedback output comprising an IIR blended video picture.

6. The method according to claim 4, further comprising computing a second said right sum based on a sum, computed by adding, over said plurality of pixels that are located to the right of said reference pixel, a value of a difference in said at least one pixel value of said current video picture and a corresponding at least one pixel value of said at least one subsequent video picture.

7. The method according to claim 4, further comprising computing a first said left sum based on a sum, computed by adding, over said plurality of pixels that are located to the left of said reference pixel, a value of a difference in at least one pixel value of said current video picture and a corresponding at least one pixel value of at least one of the following: at least one preceding video picture and feedback output comprising an IIR blended video picture.

8. The method according to claim 4, further comprising computing a second said left sum based on a sum, computed by adding, over said plurality of pixels that are located to the left of said reference pixel, a value of a difference in said at least one pixel value of said current video picture and a corresponding at least one pixel value of said at least one subsequent video picture.

9. The method according to claim 4, further comprising computing a first said upper sum based on a sum, computed by adding, over said plurality of pixels that are located above said reference pixel, a value of a difference in at least one pixel value of said current video picture and a corresponding at least one pixel value of at least one of the following: at least one preceding video picture and feedback output comprising an IIR blended video picture.

10. The method according to claim 4, further comprising computing a second said upper sum based on a sum, computed by adding, over said plurality of pixels that are located above said reference pixel, a value of a difference in said at least one pixel value of said current video picture and a corresponding at least one pixel value of said at least one subsequent video picture.

11. The method according to claim 4, further comprising computing a first said lower sum based on a sum, computed by adding, over said plurality of pixels that are located below said reference pixel, a value of a difference in at least one pixel value of said current video picture and a corresponding at least one pixel value of at least one of the following: at least one preceding video picture and feedback output comprising an IIR blended video picture.

12. The method according to claim 4, further comprising computing a second said lower sum based on a sum, computed by adding, over said plurality of pixels that are located below said reference pixel, a value of a difference in said at least one pixel value of said current video picture and a corresponding at least one pixel value of said at least one subsequent video picture.

13. A system for processing images, the system comprising:
  circuitry within a chip that enables determination of a motion metric that indicates an amount of motion between a current video picture and at least one of the following: at least one preceding video picture and at least one subsequent video picture; wherein said motion metric is computed from a maximum value derived by summing over a plurality of corresponding pixels that are located within a region around a reference pixel in a current video picture, differences in values of said plurality of corresponding pixels;
  said circuitry within said chip enables computation of a blending factor comprising a nonlinear relationship to said motion metric; and
  said circuitry within said chip enables adjustment of at least one pixel in said current video picture based on said computed blending factor.

14. The system according to claim 13, wherein at least one of the following: said current video picture, said at least one preceding video picture, and said at least one subsequent video picture is at least one of the following: a video frame, and a video field.

15. The system according to claim 13, wherein said circuitry within said chip enables computation of said motion metric by determining a maximum value comprising a right sum, a left sum, an upper sum and a lower sum.

16. The system according to claim 15, wherein at least one of the following: said right sum, said left sum, said upper sum and said lower sum, is computed over a plurality of pixels that are located within said region relative to a location of said reference pixel.

17. The system according to claim 16, wherein said circuitry within said chip enables computation of a first said right sum based on a sum, computed by adding, over said plurality of pixels that are located to the right of said reference pixel, a value of a difference in at least one pixel value of said current video picture and a corresponding at least one pixel value of at least one of the following: at least one preceding video picture and feedback output comprising an IIR blended video picture.

18. The system according to claim 16, wherein said circuitry within said chip enables computation of a second said right sum based on a sum, computed by adding, over said plurality of pixels that are located to the right of said reference pixel, a value of a difference in said at least one pixel value of said current video picture and a corresponding at least one pixel value of said at least one subsequent video picture.

19. The system according to claim 16, wherein said circuitry within said chip enables computation of a first said left sum based on a sum, computed by adding, over said plurality of pixels that are located to the left of said reference pixel, a value of a difference in at least one pixel value of said current video picture and a corresponding at least one pixel value of at least one of the following: at least one preceding video picture and feedback output comprising an IIR blended video picture.

20. The system according to claim 16, wherein said circuitry within said chip enables computation of a second said left sum based on a sum, computed by adding, over said plurality of pixels that are located to the left of said reference pixel, a value of a difference in said at least one pixel value of said current video picture and a corresponding at least one pixel value of said at least one subsequent video picture.

21. The system according to claim 16, wherein said circuitry within said chip enables computation of a first said upper sum based on a sum, computed by adding, over said plurality of pixels that are located above said reference pixel, a value of a difference in at least one pixel value of said current video picture and a corresponding at least one pixel value of at least one of the following: at least one preceding video picture and feedback output comprising an IIR blended video picture.

22. The system according to claim 16, wherein said circuitry within said chip enables computation of a second said upper sum based on a sum, computed by adding, over said plurality of pixels that are located above said reference pixel, a value of a difference in said at least one pixel value of said current video picture and a corresponding at least one pixel value of said at least one subsequent video picture.

23. The system according to claim 16, wherein said circuitry within said chip enables computation of a first said lower sum based on a sum, computed by adding, over said plurality of pixels that are located below said reference pixel, a value of a difference in at least one pixel value of said current video picture and a corresponding at least one pixel value of at least one of the following: at least one preceding video picture and feedback output comprising an IIR blended video picture.

24. The system according to claim 16, wherein said circuitry within said chip enables computation of a second said lower sum based on a sum, computed by adding, over said plurality of pixels that are located below said reference pixel, a value of a difference in said at least one pixel value of said current video picture and a corresponding at least one pixel value of said at least one subsequent video picture.

* * * * *